United States Patent
Li

(10) Patent No.: US 11,930,537 B2
(45) Date of Patent: Mar. 12, 2024

(54) RANDOM ACCESS METHOD, COMMUNICATIONS APPARATUS, CHIP, AND STORAGE MEDIUM

(71) Applicant: HUAWEI TECHNOLOGIES CO., LTD., Guangdong (CN)

(72) Inventor: Yuan Li, Bonn (DE)

(73) Assignee: Huawei Technologies Co., Ltd., Shenzhen (CN)

(*) Notice: Subject to any disclaimer, the term of this patent is extended or adjusted under 35 U.S.C. 154(b) by 521 days.

(21) Appl. No.: 17/168,264

(22) Filed: Feb. 5, 2021

(65) Prior Publication Data

US 2021/0185734 A1    Jun. 17, 2021

Related U.S. Application Data

(63) Continuation of application No. PCT/CN2019/098630, filed on Jul. 31, 2019.

(30) Foreign Application Priority Data

Aug. 7, 2018 (CN) .......................... 201810893405.0

(51) Int. Cl.
*H04W 74/08* (2009.01)
*H04L 5/00* (2006.01)
*H04W 56/00* (2009.01)

(52) U.S. Cl.
CPC ....... *H04W 74/0833* (2013.01); *H04L 5/0048* (2013.01); *H04W 56/001* (2013.01); *H04W 74/0808* (2013.01)

(58) Field of Classification Search
None
See application file for complete search history.

(56) References Cited

U.S. PATENT DOCUMENTS

| 11,051,262 B2* | 6/2021 | Qian ................. H04W 74/0833 |
| 2017/0331670 A1 | 11/2017 | Parkvall et al. |

(Continued)

FOREIGN PATENT DOCUMENTS

| CN | 107222926 A | 9/2017 |
| CN | 107370587 A | 11/2017 |

(Continued)

OTHER PUBLICATIONS

Ericsson, "Parameters for Random Access preamble groups when SSBs are configured," 3GPP TSG-RAN WG2 #100 Tdoc R2-1713479, Reno, Nevada, USA, total 6 pages, 3rd Generation Partnership Project, Valbonne, France (Nov. 27-Dec. 1, 2017).

(Continued)

*Primary Examiner* — Clemence S Han
(74) *Attorney, Agent, or Firm* — Leydig. Voit & Mayer, Ltd.

(57) ABSTRACT

Embodiments of this application provide a random access method, a communications apparatus, a chip, and a storage medium. A network device sends a first synchronization signal/PBCH block SSB on a first candidate SSB occasion, and/or sends a second SSB on a second candidate SSB occasion, where both the first candidate SSB occasion and the second candidate SSB occasion are associated with a first random access channel time-frequency-code resource. The network device receives random access information sent by a terminal device on the first random access channel time-frequency-code resource. According to the embodiments of this application, two candidate SSB occasions are mapped to a same PRACH time-frequency-code resource. In this way, even if an SSB cannot be sent on one of the two candidate SSB occasions due to a channel sensing failure, but another SSB can be sent on the other candidate SSB occasion due to a channel sensing success.

24 Claims, 12 Drawing Sheets

(56) References Cited

U.S. PATENT DOCUMENTS

| | | | |
|---|---|---|---|
| 2018/0110052 A1 | 4/2018 | Wei et al. | |
| 2019/0254077 A1* | 8/2019 | Sahlin | H04L 5/0092 |
| 2019/0387546 A1* | 12/2019 | Li | H04L 27/26132 |
| 2020/0275479 A1* | 8/2020 | Peisa | H04W 74/0833 |
| 2021/0112602 A1* | 4/2021 | Li | H04W 72/23 |
| 2021/0274561 A1* | 9/2021 | Li | H04W 74/0808 |
| 2021/0307061 A1* | 9/2021 | Huang | H04W 74/006 |
| 2021/0352734 A1* | 11/2021 | Svedman | H04W 72/1263 |
| 2022/0086774 A1* | 3/2022 | Qian | H04W 72/0446 |

FOREIGN PATENT DOCUMENTS

| | | |
|---|---|---|
| CN | 107409028 A | 11/2017 |
| CN | 107517501 A | 12/2017 |
| CN | 108235444 A | 6/2018 |
| CN | 108270531 A | 7/2018 |
| CN | 108270710 A | 7/2018 |
| CN | 108282270 A | 7/2018 |
| CN | 108282859 A | 7/2018 |
| CN | 108353349 A | 7/2018 |
| CN | 108419300 A | 8/2018 |
| CN | 110050506 A | 7/2019 |
| CN | 105379376 B | 3/2020 |
| CN | 108353050 B | 7/2020 |
| EP | 2896253 B1 | 4/2017 |
| WO | 2016096032 A1 | 6/2016 |
| WO | 2017119925 A1 | 7/2017 |
| WO | 2018083662 A1 | 5/2018 |
| WO | 2018128427 A1 | 7/2018 |

OTHER PUBLICATIONS

3GPP TS 38.104 V15.2.0; 3rd Generation Partnership Project; Technical Specification Group Radio Access Network; NR; Base Station (BS) radio transmission and reception (Release 15); total 147 pages, 3rd Generation Partnership Project, Valbonne, France (Jun. 2018).

3GPP TS 38.211 V15.2.0; 3rd Generation Partnership Project; Technical Specification Group Radio Access Network; NR; Physical channels and modulation (Release 15); total 96 pages, 3rd Generation Partnership Project, Valbonne, France (Jun. 2018).

3GPP TS 38.212 V15.2.0; 3rd Generation Partnership Project; Technical Specification Group Radio Access Network; NR; Multiplexing and channel coding (Release 15); total 98 pages, 3rd Generation Partnership Project, Valbonne, France (Jun. 2018).

3GPP TS 38.213 V15.2.0; 3rd Generation Partnership Project; Technical Specification Group Radio Access Network; NR; Physical layer procedures for control (Release 15); total 99 pages, 3rd Generation Partnership Project, Valbonne, France (Jun. 2018).

3GPP TS 38.214 V15.2.0; 3rd Generation Partnership Project; Technical Specification Group Radio Access Network; NR; Physical layer procedures for data (Release 15), 95 pages, 3rd Generation Partnership Project, Valbonne, France (Jun. 2018).

"Initial access in NR unlicensed," [online] 3GPP TSG RAN WG1 Meeting #93, Busan, Korea, R1-1805920, Total 8 pages, 3rd Generation Partnership Project, Valbonne, France (May 21-25, 2018).

"Discussion on SS block time index indication," [online] 3GPP TSG RAN WG1 Meeting #89, Hangzhou, P.R. China, R1-1707589, Total 5 pages, 3rd Generation Partnership Project, Valbonne, France (May 15-19, 2017).

Berardinelli et al., "On the potential of zero-Tail DFT-Spread-OFDM in 5G Networks," 2014 IEEE 80th Vehicular Technology Conference (VTC2014—Fall), total 6 pages (Dec. 4, 2014).

Li Wanchao, "The Network Optimization Methods Research of TD-LTE Base Station," Hainan University, total 2 pages (2017). With English abstract.

* cited by examiner

RANDOM ACCESS METHOD, COMMUNICATIONS APPARATUS, CHIP, AND STORAGE MEDIUM

CROSS-REFERENCE TO RELATED APPLICATIONS

This application is a continuation of International Application No. PCT/CN2019/098630, filed on Jul. 31, 2019, which claims priority to Chinese Patent Application No. 201810893405.0, filed on Aug. 7, 2018. The disclosures of the aforementioned applications are hereby incorporated by reference in their entireties.

TECHNICAL FIELD

This application relates to the field of communications technologies, and in particular, to a random access method, a communications apparatus, a chip, and a storage medium.

BACKGROUND

To resolve a problem that a quantity of available frequency domain resources on a licensed spectrum is relatively small, a new radio unlicensed (new radio unlicensed, NRU) system is introduced in 5G. The NRU system may completely work on an unlicensed spectrum without assistance of a licensed spectrum. Currently, when sending a synchronization signal/PBCH block (SS/PBCH block, SSB) on the unlicensed spectrum, a network device in the NRU system may send a plurality of SSBs on a plurality of candidate SSB occasions in one SSB time window. The SSBs may be sent by using different beams, to extend coverage of a cell. After detecting an SSB sent by the network device, a terminal device may determine, based on a mapping relationship between an SSB and a physical random access channel (physical random access channel, PRACH) time-frequency-code resource, a PRACH time-frequency-code resource associated with the detected SSB, and send random access information to the network device on the PRACH time-frequency-code resource, to request to access the cell.

When using the unlicensed spectrum, the network device and the terminal device in the NRU system use a listen-before-talk (Listen-Before-Talk, LBT) channel access mechanism, so that the unlicensed spectrum can be jointly used by the NRU system and another system (for example, a communications system of a different operator or a Wi-Fi network). Therefore, to increase an SSB sending occasion, in the NRU system, a quantity of candidate SSB occasions (resources each used to send one SSB) supported in the SSB time window is increased. In this way, more candidate SSB occasions are available to the network device to send SSBs, to cover all terminal devices in the cell.

Based on an existing mapping relationship between an SSB and a PRACH time-frequency-code resource, mapping of SSBs to PRACH time-frequency-code resources is mapping the SSBs to different PRACH time-frequency-code resources based on indexes of candidate SSB occasions in the SSB time window that are used to send the SSBs. For the NRU system, the network device may fail, due to the LBT, to occupy some candidate SSB occasions to send SSBs. Therefore, a waste of PRACH time-frequency-code resources is likely to occur in an existing manner of mapping an SSB to a PRACH time-frequency-code resource.

SUMMARY

Embodiments of this application provide a random access method, a communications apparatus, a chip, and a storage medium, to map two candidate SSB occasions to a same PRACH time-frequency-code resource, thereby improving utilization of PRACH time-frequency-code resources in a PRACH periodicity.

According to a first aspect, an embodiment of this application provides a random access method. The method includes:

A network device sends a first synchronization signal/PBCH block SSB on a first candidate SSB occasion, and/or sends a second SSB on a second candidate SSB occasion, where both the first candidate SSB occasion and the second candidate SSB occasion are associated with a first random access channel time-frequency-code resource.

The network device receives random access information sent by a terminal device on the first random access channel time-frequency-code resource.

According to the random access method provided in the first aspect, two candidate SSB occasions are mapped to a same PRACH time-frequency-code resource. In this way, when the network device sends an SSB on a candidate SSB occasion based on a result of channel sensing, even if an SSB cannot be sent on one of the two candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, the first candidate SSB occasion and the second candidate SSB occasion are candidate SSB occasions in a same SSB sending periodicity or a same SSB time window.

According to the random access method provided in this possible implementation, two candidate SSB occasions in a same SSB sending periodicity are mapped to a same PRACH time-frequency-code resource. In this way, when the network device sends an SSB on a candidate SSB occasion based on a result of channel sensing, even if an SSB cannot be sent on one of the two candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, the first candidate SSB occasion occupies a first time unit in time domain and occupies a first subband in frequency domain; and the second candidate SSB occasion occupies a second time unit in time domain and occupies the first subband in frequency domain.

According to the random access method provided in this possible implementation, candidate SSB occasions corresponding to different time units are mapped to a same PRACH time-frequency-code resource. Even if an SSB cannot be sent on one of the candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, a first candidate SSB occasion set includes at least two candidate SSB occasions, and a second candidate SSB occasion set includes at least two candidate SSB occasions. The candidate SSB occasions in the first candidate SSB occasion set are associated with different random access channel time-frequency-code resources, and the candidate SSB occasions in the second candidate SSB occasion set are associated with different random access channel time-frequency-code resources. The first candidate SSB occasion is a candidate SSB occasion in the first candidate SSB occasion set, and the second candidate SSB occasion is a candidate SSB occasion in the second candidate SSB occasion set.

According to the random access method provided in this possible implementation, different candidate SSB occasions in two candidate SSB occasion sets are mapped to a same PRACH time-frequency-code resource. Even if an SSB cannot be sent on one of the candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, the first candidate SSB occasion and the second candidate SSB occasion are included in L candidate SSB occasions, and any one of the L candidate SSB occasions is used to send one SSB;
  when L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer; and
  any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

According to the random access method provided in this possible implementation, different candidate SSB occasions in any two candidate SSB occasion sets in the L candidate SSB occasions are mapped to a same PRACH time-frequency-code resource. Even if an SSB cannot be sent on one of the candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the terminal device to send the random access information.

According to the random access method provided in this possible implementation, in the foregoing manner of mapping the candidate SSB occasion to the time-frequency-code resource used for the random access information, all candidate SSB occasions in a candidate SSB occasion set may be mapped to all available PRACH time-frequency-code resources in a PRACH time-frequency-code resource set. In other words, all candidate SSB occasions in one candidate SSB occasion set occupy all available PRACH time-frequency-code resources in one PRACH periodicity. In this way, the network device sends SSBs on all the candidate SSB occasions in the candidate SSB occasion set, to ensure that PRACH resources are not wasted. If an SSB fails to be sent on a candidate SSB occasion in the candidate SSB occasion set due to channel sensing failure, but channel sensing succeeds before a candidate SSB occasion, in a next candidate SSB occasion set, mapped to a same PRACH time-frequency-code resource to which the candidate SSB occasion is mapped and an SSB is sent, it can be ensured that the PRACH time-frequency-code resource is not wasted.

In a possible implementation, the first candidate SSB occasion and the second candidate SSB occasion are included in L candidate SSB occasions, and any one of the L candidate SSB occasions is used to send one SSB; and
  the L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the terminal device to send the random access information, where M is a positive integer.

According to the random access method provided in this possible implementation, in the foregoing manner of mapping the candidate SSB occasion to the time-frequency-code resource used for the random access information, all candidate SSB occasions may be mapped to all available PRACH time-frequency-code resources in a PRACH time-frequency-code resource set. In other words, all candidate SSB occasions in one mapping periodicity occupy all available PRACH time-frequency-code resources in one PRACH periodicity. In this way, the network device sends SSBs on all the candidate SSB occasions in the mapping periodicity, to ensure that PRACH resources are not wasted. If an SSB fails to be sent on a candidate SSB occasion in a mapping periodicity due to channel sensing, but channel sensing succeeds before a candidate SSB occasion, in a next mapping periodicity, mapped to a same PRACH time-frequency-code resource to which the candidate SSB occasion is mapped and an SSB is sent, it can be ensured that the PRACH resource is not wasted.

In a possible implementation, there is an interval of M−1 candidate SSB occasions between the first time unit and the second time unit, where M is an integer greater than 1.

According to the random access method provided in this possible implementation, some candidate SSB occasions in an SSB time window are mapped to a same PRACH time-frequency-code resource. In this way, when the network device sends an SSB on a candidate SSB occasion based on a result of channel sensing, even if an SSB cannot be sent on one of the candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

In a possible implementation, M is a maximum quantity of SSBs that are allowed to be sent by the network device in an SSB sending periodicity.

According to the random access method provided in this possible implementation, a candidate SSB occasion in the SSB time window is mapped to a PRACH time-frequency-code resource in a cyclic shift mapping manner, so that a plurality of candidate SSB occasions in the SSB time window are mapped to a same PRACH time-frequency-code resource. In this way, the network device may select, based on a result of channel sensing, one of the plurality of candidate SSB occasions to send an SSB, so that actually sent SSBs can be mapped to all available PRACH resources without affecting unique associations between the PRACH time-frequency-code resources and the actually sent SSBs, thereby more efficiently using the PRACH resources and avoiding a waste of the PRACH resources.

In a possible implementation, M is configured by the network device for the terminal device by using broadcast information.

In a possible implementation, when the network device sends the first synchronization signal/PBCH block SSB on the first candidate SSB occasion, and sends the second SSB on the second candidate SSB occasion, a beam direction in which the network device sends the first SSB is the same as a beam direction in which the network device sends the second SSB.

According to the random access method provided in this possible implementation, the beam direction in which the network device sends the first SSB on the first candidate SSB occasion is the same as or approximate to the beam direction in which the network device sends the second SSB on the second candidate SSB occasion. In this way, any one or more SSBs, in a plurality of SSBs, detected by the terminal device may be mapped to a same PRACH resource to send PRACH information. After the network device receives the PRACH information, although the PRACH information is associated with a plurality of candidate SSB occasions, because a same beam direction is used for the candidate SSB occasions, the network device may send subsequent downlink information to the terminal device in the beam direction. In this way, the beam direction of the subsequent downlink information is the same as a beam direction of the SSB, thereby avoiding a problem that a definite beam direction cannot be determined.

In a possible implementation, the first candidate SSB occasion occupies a first time unit in time domain and occupies a first subband in frequency domain; and the second candidate SSB occasion occupies the first time unit in time domain and occupies a second subband in frequency domain.

According to the random access method provided in this possible implementation, the network device maps SSBs in all subbands corresponding to a same time unit to a same PRACH time-frequency-code resource. In this way, as long as channel sensing in one subband succeeds, an SSB may be sent in a current time unit, thereby avoiding a waste of PRACH resources.

In a possible implementation, the first candidate SSB occasion is located before the second candidate SSB occasion; and
  when the network device successfully performs channel sensing before the first candidate SSB occasion and before the second candidate SSB occasion, the network device sends the first SSB on the first candidate SSB occasion, and skips sending the second SSB on the second candidate SSB occasion; or the network device sends the second SSB on the second candidate SSB occasion, and skips sending the first SSB on the first candidate SSB occasion.

According to the random access method provided in this possible implementation, when channel sensing is successfully performed before two candidate SSB occasions, the network device may send an SSB on only one candidate SSB occasion, to avoid a problem that a definite beam direction cannot be determined. In this way, one PRACH resource may still be uniquely associated with the SSB actually sent by the network device, so that the network device can obtain a beam direction used for the actually sent SSB, and send subsequent downlink information in the beam direction or a beam direction approximate to the beam direction.

According to a second aspect, an embodiment of this application provides a random access method. The method includes:

A terminal device receives a first synchronization signal/PBCH block SSB sent by a network device on a first candidate SSB occasion, and/or receives a second SSB sent by the network device on a second candidate SSB occasion, where both the first candidate SSB occasion and the second candidate SSB occasion are associated with a first random access channel time-frequency-code resource.

The terminal device sends random access information to the network device on the first random access channel time-frequency-code resource.

In a possible implementation, the first candidate SSB occasion and the second candidate SSB occasion are candidate SSB occasions in a same SSB sending periodicity.

In a possible implementation, the first candidate SSB occasion occupies a first time unit in time domain and occupies a first subband in frequency domain; and the second candidate SSB occasion occupies a second time unit in time domain and occupies the first subband in frequency domain.

In a possible implementation, a first candidate SSB occasion set includes at least two candidate SSB occasions, and a second candidate SSB occasion set includes at least two candidate SSB occasions. The candidate SSB occasions in the first candidate SSB occasion set are associated with different random access channel time-frequency-code resources, and the candidate SSB occasions in the second candidate SSB occasion set are associated with different random access channel time-frequency-code resources. The first candidate SSB occasion is a candidate SSB occasion in the first candidate SSB occasion set, and the second candidate SSB occasion is a candidate SSB occasion in the second candidate SSB occasion set.

In a possible implementation, the first candidate SSB occasion and the second candidate SSB occasion are included in L candidate SSB occasions, and any one of the L candidate SSB occasions is used to send one SSB;
  when L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer; and
  any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

In a possible implementation, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the terminal device to send the random access information.

In a possible implementation, the first candidate SSB occasion and the second candidate SSB occasion are included in L candidate SSB occasions, and any one of the L candidate SSB occasions is used to send one SSB; and
  the L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the terminal device to send the random access information, where M is a positive integer.

In a possible implementation, there is an interval of M−1 candidate SSB occasions between the first time unit and the second time unit, where M is an integer greater than 1.

In a possible implementation, M is a maximum quantity of SSBs that are allowed to be sent by the network device in an SSB sending periodicity.

In a possible implementation, M is configured by the network device for the terminal device by using broadcast information.

In a possible implementation, when the network device sends the first synchronization signal/PBCH block SSB on the first candidate SSB occasion, and sends the second SSB on the second candidate SSB occasion, a beam direction in which the network device sends the first SSB is the same as a beam direction in which the network device sends the second SSB.

In a possible implementation, the first candidate SSB occasion occupies a first time unit in time domain and occupies a first subband in frequency domain; and the second candidate SSB occasion occupies the first time unit in time domain and occupies a second subband in frequency domain.

For beneficial effects of the random access method provided in the second aspect and the possible implementations of the second aspect, refer to the beneficial effects in the first aspect and the possible implementations of the first aspect. Details are not described herein again.

According to a third aspect, an embodiment of this application provides a communications apparatus. The communications apparatus may be a network device, or may be a chip used in a network device. The communications apparatus includes:
  a sending module, configured to send a first synchronization signal/PBCH block SSB on a first candidate SSB occasion, and/or send a second SSB on a second candidate SSB occasion, where both the first candidate SSB occasion and the second candidate SSB occasion are associated with a first random access channel time-frequency-code resource; and
  a receiving module, configured to receive random access information sent by a terminal device on the first random access channel time-frequency-code resource.

In a possible implementation, the first candidate SSB occasion and the second candidate SSB occasion are candidate SSB occasions in a same SSB sending periodicity.

In a possible implementation, the first candidate SSB occasion occupies a first time unit in time domain and occupies a first subband in frequency domain; and the second candidate SSB occasion occupies a second time unit in time domain and occupies the first subband in frequency domain.

In a possible implementation, a first candidate SSB occasion set includes at least two candidate SSB occasions, and a second candidate SSB occasion set includes at least two candidate SSB occasions. The candidate SSB occasions in the first candidate SSB occasion set are associated with different random access channel time-frequency-code resources, and the candidate SSB occasions in the second candidate SSB occasion set are associated with different random access channel time-frequency-code resources. The first candidate SSB occasion is a candidate SSB occasion in the first candidate SSB occasion set, and the second candidate SSB occasion is a candidate SSB occasion in the second candidate SSB occasion set.

In a possible implementation, the first candidate SSB occasion and the second candidate SSB occasion are included in L candidate SSB occasions, and any one of the L candidate SSB occasions is used to send one SSB;
  when L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer; and
  any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

In a possible implementation, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the terminal device to send the random access information.

In a possible implementation, the first candidate SSB occasion and the second candidate SSB occasion are included in L candidate SSB occasions, and any one of the L candidate SSB occasions is used to send one SSB; and the L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the terminal device to send the random access information, where M is a positive integer.

In a possible implementation, there is an interval of M−1 candidate SSB occasions between the first time unit and the second time unit, where M is an integer greater than 1.

In a possible implementation, M is a maximum quantity of SSBs that are allowed to be sent by the communications apparatus in an SSB sending periodicity.

In a possible implementation, M is configured by the communications apparatus for the terminal device by using broadcast information.

In a possible implementation, when the sending module sends the first synchronization signal/PBCH block SSB on the first candidate SSB occasion, and sends the second SSB on the second candidate SSB occasion, a beam direction in which the sending module sends the first SSB is the same as a beam direction in which the sending module sends the second SSB.

In a possible implementation, the first candidate SSB occasion occupies a first time unit in time domain and occupies a first subband in frequency domain; and the second candidate SSB occasion occupies the first time unit in time domain and occupies a second subband in frequency domain.

In a possible implementation, the apparatus further includes:
  a processing module, configured to: when channel sensing is successfully performed before the first candidate SSB occasion and before the second candidate SSB occasion, control the sending module to send the first SSB on the first candidate SSB occasion and to skip sending the second SSB on the second candidate SSB occasion, or control the sending module to send the second SSB on the second candidate SSB occasion and to skip sending the first SSB on the first candidate SSB occasion, where the first candidate SSB occasion is located before the second candidate SSB occasion.

For beneficial effects of the communications apparatus provided in the third aspect and the possible implementations of the third aspect, refer to the beneficial effects in the first aspect and the possible implementations of the first aspect. Details are not described herein again.

According to a fourth aspect, an embodiment of this application provides a communications apparatus. The communications apparatus may be a terminal device, or may be a chip used in a terminal device. The communications apparatus includes:
  a receiving module, configured to receive a first synchronization signal/PBCH block SSB sent by a network device on a first candidate SSB occasion, and/or receive a second SSB sent by the network device on a second candidate SSB occasion, where both the first candidate SSB occasion and the second candidate SSB occasion are associated with a first random access channel time-frequency-code resource; and
  a sending module, configured to send random access information to the network device on the first random access channel time-frequency-code resource.

In a possible implementation, the first candidate SSB occasion and the second candidate SSB occasion are candidate SSB occasions in a same SSB sending periodicity.

In a possible implementation, the first candidate SSB occasion occupies a first time unit in time domain and occupies a first subband in frequency domain; and the second candidate SSB occasion occupies a second time unit in time domain and occupies the first subband in frequency domain.

In a possible implementation, a first candidate SSB occasion set includes at least two candidate SSB occasions, and a second candidate SSB occasion set includes at least two candidate SSB occasions. The candidate SSB occasions in the first candidate SSB occasion set are associated with different random access channel time-frequency-code resources, and the candidate SSB occasions in the second candidate SSB occasion set are associated with different random access channel time-frequency-code resources. The first candidate SSB occasion is a candidate SSB occasion in the first candidate SSB occasion set, and the second candidate SSB occasion is a candidate SSB occasion in the second candidate SSB occasion set.

In a possible implementation, the first candidate SSB occasion and the second candidate SSB occasion are included in L candidate SSB occasions, and any one of the L candidate SSB occasions is used to send one SSB;
  when L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer; and
  any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

In a possible implementation, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the communications apparatus to send the random access information.

In a possible implementation, the first candidate SSB occasion and the second candidate SSB occasion are included in L candidate SSB occasions, and any one of the L candidate SSB occasions is used to send one SSB; and the L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the communications apparatus to send the random access information, where M is a positive integer.

In a possible implementation, there is an interval of M−1 candidate SSB occasions between the first time unit and the second time unit, where M is an integer greater than 1.

In a possible implementation, M is a maximum quantity of SSBs that are allowed to be sent by the network device in an SSB sending periodicity.

In a possible implementation, M is configured by the network device for the communications apparatus by using broadcast information.

In a possible implementation, when the network device sends the first synchronization signal/PBCH block SSB on the first candidate SSB occasion, and sends the second SSB on the second candidate SSB occasion, a beam direction in which the network device sends the first SSB is the same as a beam direction in which the network device sends the second SSB.

In a possible implementation, the first candidate SSB occasion occupies a first time unit in time domain and occupies a first subband in frequency domain; and the second candidate SSB occasion occupies the first time unit in time domain and occupies a second subband in frequency domain.

For beneficial effects of the communications apparatus provided in the fourth aspect and the possible implementations of the fourth aspect, refer to the beneficial effects in the first aspect and the possible implementations of the first aspect. Details are not described herein again.

According to a fifth aspect, an embodiment of this application provides a communications apparatus. The communications apparatus includes a processor, a memory, a receiver, and a transmitter. The receiver and the transmitter are both coupled to the processor. The processor controls a receiving action of the receiver, and controls a sending action of the transmitter.

The memory is configured to store computer-executable program code, and the program code includes an instruction. When the processor executes the instruction, the instruction enables the communications apparatus to perform the random access method according to any one of the first aspect or the possible implementations of the first aspect.

According to a sixth aspect, an embodiment of this application provides a communications apparatus. The communications apparatus includes a processor, a memory, a receiver, and a transmitter. The receiver and the transmitter are both coupled to the processor. The processor controls a receiving action of the receiver, and controls a sending action of the transmitter.

The memory is configured to store computer-executable program code, and the program code includes an instruction. When the processor executes the instruction, the instruction enables the communications apparatus to perform the random access method according to any one of the second aspect or the possible implementations of the second aspect.

According to a seventh aspect, an embodiment of this application provides a communications apparatus, including a unit, module, or circuit configured to perform the method according to any one of the first aspect or the possible implementations of the first aspect. The communications apparatus may be a network device, or may be a module used in a network device, for example, a chip used in the network device.

According to an eighth aspect, an embodiment of this application provides a communications apparatus, including a unit, module, or circuit configured to perform the method according to any one of the second aspect or the possible implementations of the second aspect. The communications apparatus may be a terminal device, or may be a module used in a terminal device, for example, a chip used in the terminal device.

According to a ninth aspect, an embodiment of this application provides a computer program product including an instruction. When the computer program product is run on a computer, the computer is enabled to perform the method according to any one of the first aspect or the possible implementations of the first aspect.

According to a tenth aspect, an embodiment of this application provides a computer program product including an instruction. When the computer program product is run on a computer, the computer is enabled to perform the method according to any one of the second aspect or the possible implementations of the second aspect.

According to an eleventh aspect, an embodiment of this application provides a computer-readable storage medium. The computer-readable storage medium stores an instruction, and when the instruction is run on a computer, the computer is enabled to perform the method according to any one of the first aspect or the possible implementations of the first aspect.

According to a twelfth aspect, an embodiment of this application provides a computer-readable storage medium. The computer-readable storage medium stores an instruction, and when the instruction is run on a computer, the computer is enabled to perform the method according to any one of the second aspect or the possible implementations of the second aspect.

According to a thirteenth aspect, an embodiment of this application provides a chip. The chip stores a computer program. When the computer program is executed by the chip, the method according to any one of the first aspect or the possible implementations of the first aspect is implemented.

According to a fourteenth aspect, an embodiment of this application provides a chip. The chip stores a computer program. When the computer program is executed by the chip, the method according to any one of the second aspect or the possible implementations of the second aspect is implemented.

According to the random access method, the communications apparatus, the chip, and the storage medium that are provided in the embodiments of this application, two candidate SSB occasions are mapped to a same PRACH time-frequency-code resource. In this way, when the network device sends an SSB on a candidate SSB occasion based on a result of channel sensing, even if an SSB cannot be sent on one of the two candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

DESCRIPTION OF EMBODIMENTS

Figure 1:
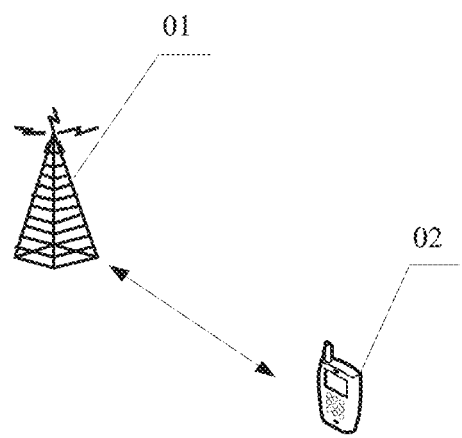
FIG. 1 is a framework diagram of a communications system according to an embodiment of this application.

FIG. 1 is a framework diagram of a communications system according to an embodiment of this application. As shown in FIG. 1, the communications system includes a network device 01 and a terminal device 02.

The network device 01 may be a base station or a radio access point, or may be a device that communicates with a terminal device over an air interface by using one or more sectors in an access network. The base station may be configured to perform mutual conversion between a received over-the-air frame and an IP packet, and serve as a router between a wireless terminal and a remaining portion of the access network, where the remaining portion of the access network may include an internet protocol (IP) network. The base station may further coordinate attribute management of the air interface. For example, the base station may be a base transceiver station (base transceiver station, BTS) in global system for mobile communications (global system for mobile communication, GSM) or code division multiple access (code division multiple access, CDMA), may be a NodeB (nodeB, NB) in wideband code division multiple access (wideband code division multiple access, WCDMA), may be an evolved NodeB (evolved node B, eNB or eNodeB) in long term evolution (long term evolution, LTE), a relay station, or an access point, or may be a gNodeB gNB in a 5G network. This is not limited herein.

The terminal device 02 may be a wireless terminal or a wired terminal. The wireless terminal may be a device that provides a user with a voice and/or other service data connectivity, a handheld device with a wireless connection function, or another processing device connected to a wireless modem. The wireless terminal may communicate with one or more core networks through a radio access network (radio access network, RAN). The wireless terminal may be a mobile terminal, such as a mobile phone (or referred to as a "cellular" phone) or a computer with a mobile terminal, and for example, may be a portable, pocket-sized, handheld, computer built-in, or in-vehicle mobile apparatus, which exchanges a voice and/or data with the radio access network. For example, the wireless terminal may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The wireless terminal may also be referred to as a system, a subscriber unit (subscriber unit), a subscriber station (subscriber station), a mobile station (mobile station), a mobile station (mobile), a remote station (remote station), a remote terminal (remote terminal), an access terminal (access terminal), a user terminal (user terminal), a user agent (user agent), user equipment (a user device or user equipment), or a sensor with a network access function. This is not limited herein.

In the embodiments of this application, the communications system may work on a licensed spectrum, or may work on an unlicensed spectrum. To be specific, the network device sends downlink information on the licensed spectrum or the unlicensed spectrum, and the terminal device sends uplink information on the licensed spectrum or the unlicensed spectrum.

It should be noted that the communications system may be an LTE communications system, or may be another future communications system. This is not limited herein.

A 5G new radio (5th generation new radio, 5G NR) communications system (NR system for short) is used as an example. In the NR system, a synchronization signal/PBCH block (SS/PBCH block, SSB) includes a primary synchronization signal (primary synchronization signal, PSS), a secondary synchronization signal (secondary synchronization signal, SSS), and a broadcast channel (physical broadcast channel, PBCH), and is used to implement a function of initial access to a cell.

Figure 2:
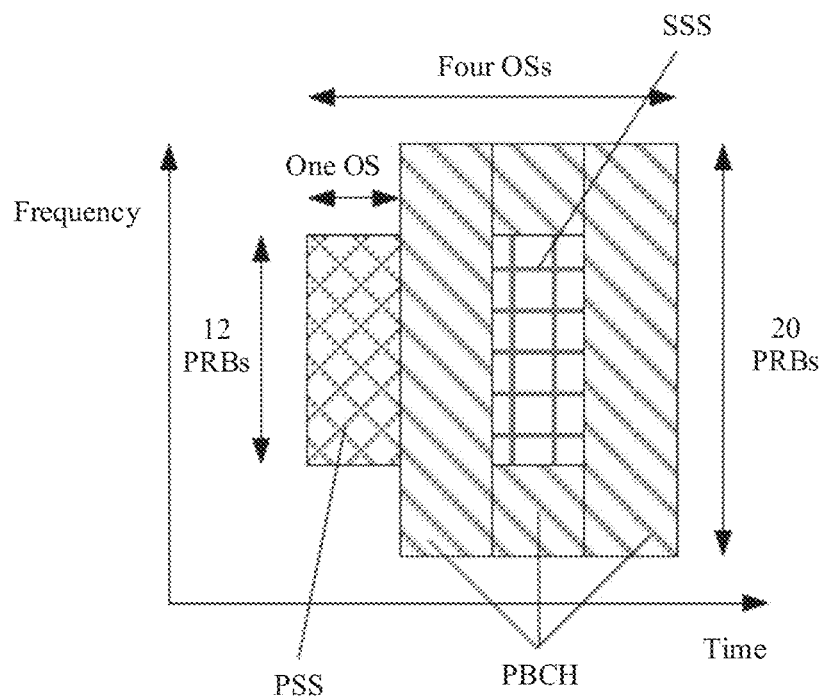
FIG. 2 is a schematic diagram of a time domain resource according to an embodiment of this application.

FIG. 2 is a schematic diagram of a time domain resource according to an embodiment of this application. As shown in FIG. 2, in an NR system, transmission of one SSB occupies four orthogonal frequency division multiplexing symbols (orthogonal frequency division multiplexing symbol, OS) (also referred to as time domain symbols) in time domain, and occupies 20 physical resource blocks (physical resource block, PRB) in frequency domain. In the following content of this application, a resource used to transmit one SSB is referred to as one candidate SSB occasion.

Figure 3:
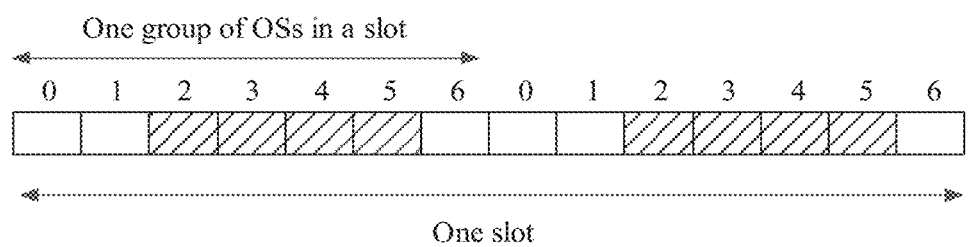
FIG. 3 is a schematic diagram of another time domain resource according to an embodiment of this application.

FIG. 3 is a schematic diagram of another time domain resource according to an embodiment of this application. As shown in FIG. 3, in an NR system, one slot (slot) may include a plurality of groups of time domain symbols, and each group of time domain symbols may include a plurality of time domain symbols. A maximum of two SSBs can be carried in one slot, and the two SSBs are separately located on different groups of time domain symbols of the slot. In other words, one slot includes a maximum of two candidate SSB occasions. FIG. 3 is a schematic diagram of an example in which one slot includes two groups of time domain symbols and each group of time domain symbols includes seven time domain symbols. Duration occupied by one slot and a quantity of groups of time domain symbols included in the slot may be specifically determined based on a subcarrier spacing used in the NR system.

In the NR system, there is the concept of SSB time window. One SSB time window includes a maximum of L candidate SSB occasions. In other words, one SSB time window supports a maximum of L SSBs. Herein, L is a positive integer. In one SSB time window, a network device may send, in a beam sweeping (beam sweeping) manner, beamformed SSBs on different candidate SSB occasions and in a same beam direction or different beam directions. In this manner, more terminal devices can receive SSBs in one SSB time window, thereby extending coverage. The SSB time window may periodically appear, so that the network device can periodically send SSBs. For example, the SSB time window may appear every 40 ms. For example, if a length of the SSB time window is 5 ms, the SSB time window may be the first 5 ms in 40 ms.

To be specific, the network device periodically sends SSBs by using a preset or configured time length as a periodicity, and sends the SSB only in an SSB time window in an SSB sending periodicity. The preset or configured time length may be referred to as an SSB sending periodicity length, and a time period from a start point of one periodicity to a start point of a next periodicity, or from an SSB time window to a next SSB time window may be referred to as one SSB sending periodicity. For example, the SSB sending periodicity length is 5 ms, 10 ms, 20 ms, 40 ms, 80 ms, or 160 ms, and the network device sends, in an SSB time window in each SSB sending periodicity (for example, the first 5 ms of each SSB sending periodicity), an SSB in the periodicity. The network device may notify the terminal device of the SSB sending periodicity by using a broadcast message, for example, higher layer signaling SSB-periodicityServingCell. A beam direction corresponding to an SSB sent on a candidate SSB occasion in one SSB sending periodicity may be the same as or approximate to a beam direction corresponding to an SSB sent on a candidate SSB occasion in a same time position in another SSB sending periodicity. In this way, the terminal device may combine SSBs that are sent on candidate SSB occasions that are in a same time position in two different SSB sending periodicities, to improve an SSB detection success rate.

It should be understood that the SSB time window is a time window used to send an SSB in one SSB sending periodicity. The length of the SSB time window is less than or equal to the SSB sending periodicity. In an existing NR system, the length of the SSB time window is 5 ms, in other words, is half frame (half frame). A start point of the SSB time window may be a start point of the SSB sending periodicity. For an NRU system, to increase an SSB sending occasion, the length of the SSB time window may alternatively be redefined as a value greater than 5 ms, for example, 6 ms, 7 ms, 8 ms, 9 ms, or 10 ms.

Figure 4:
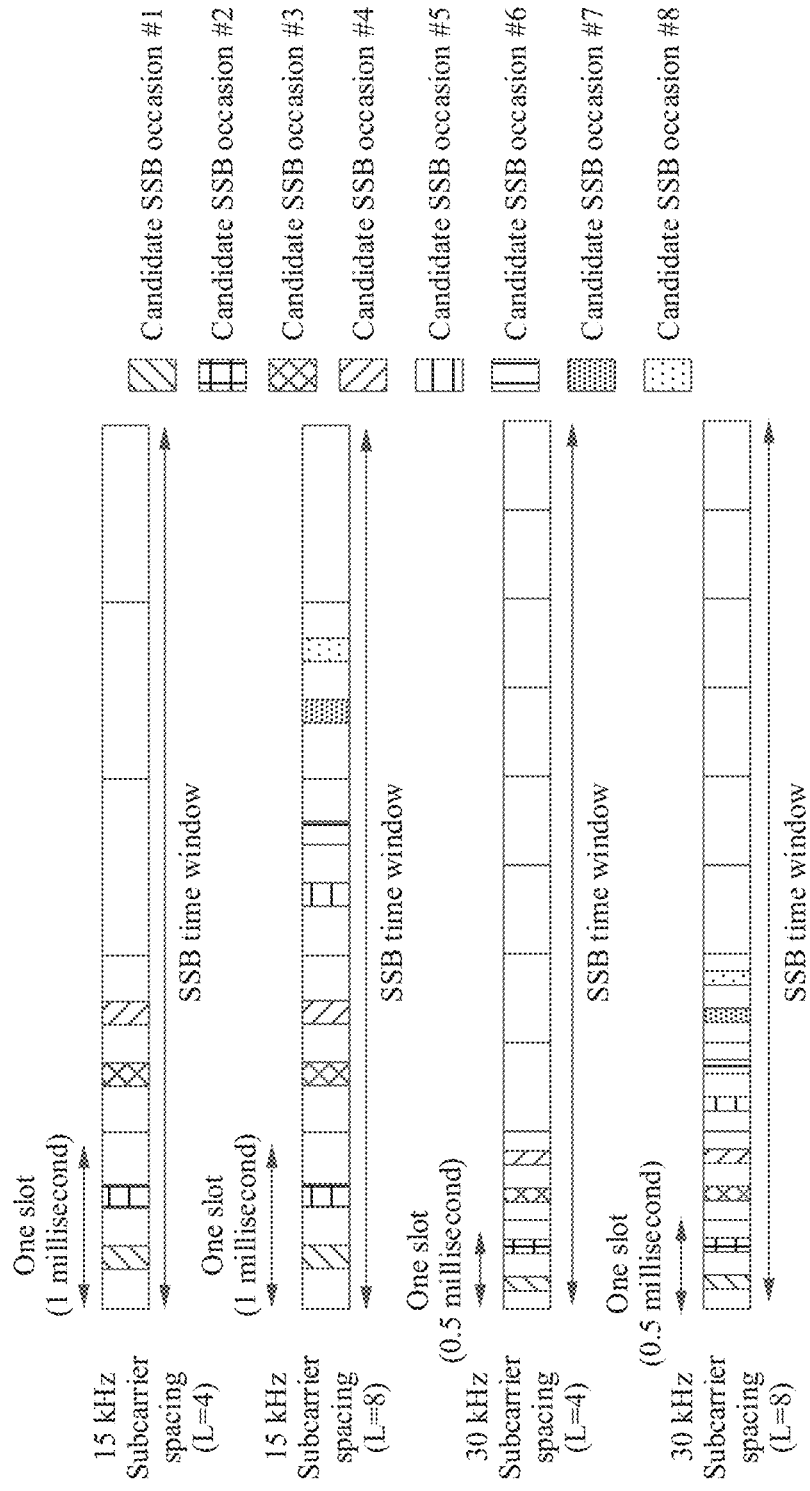
FIG. 4 is a schematic diagram of still another time domain resource according to an embodiment of this application.

A maximum quantity (namely, a value of L) of candidate SSB occasions included in one SSB time window and distribution of the L candidate SSB occasions in the SSB time window are not limited in the embodiments of this application. FIG. 4 is a schematic diagram of still another time domain resource according to an embodiment of this application. As shown in FIG. 4, for example, a length of an SSB time window is 5 ms. FIG. 4 shows distribution of candidate SSB occasions in the SSB time window when a subcarrier spacing is 15 kHz and L is separately 4 and 8 and distribution of candidate SSB occasions in the SSB time window when the subcarrier spacing is 30 kHz and L is separately 4 and 8. However, a person skilled in the art may understand that FIG. 4 is merely an example, and does not constitute a limitation on the length of the SSB time window, the value of L, and the distribution of the L candidate SSB occasions in the SSB time window.

When the length of the SSB time window, the value of L, and the distribution of the L candidate SSB occasions in the SSB time window are fixed, time domain positions of the L candidate SSB occasions in the SSB time window are determined. Therefore, when the network device sends an SSB on any one of the L candidate SSB occasions, the SSB is used to indicate an SSB index (SSB index) of the SSB in a maximum of L SSBs supported in the SSB time window. In this way, a terminal device that receives the SSB may determine, based on the SSB index of the SSB, an absolute moment corresponding to the SSB, to achieve time synchronization. The SSB index is consistent with an index of the candidate SSB occasion for sending the SSB in the L candidate SSB occasions. Therefore, in the embodiments of this application, the SSB index and the index of the candidate SSB occasion are equivalent to each other, and are not distinguished. In a specific implementation, when L is less than or equal to 8, the network device may indicate an SSB index of an SSB by using a demodulation reference signal (demodulation reference signal, DMRS) sequence carried in the SSB. One DMRS sequence corresponds to one SSB index. When L is greater than 8, the network device may indicate an SSB index of an SSB by using a DMRS sequence carried in the SSB and 3-bit information on a PBCH carried in the SSB.

In the NR system, a PRACH periodicity periodically appears, and a corresponding time domain resource and a corresponding frequency domain resource that are used to send random access information (namely, PRACH information) in one PRACH periodicity are referred to as one PRACH occasion (PRACH Occasion, RO). One PRACH occasion may carry at least one preamble (preamble) sequence, the at least one preamble sequence is distinguished in a code division-orthogonal manner, and one preamble sequence corresponds to one preamble index. One terminal device may select one preamble sequence to be sent on the PRACH occasion. When one PRACH occasion includes a plurality of available preamble sequences, a plurality of terminal devices may select preamble sequences corresponding to different preamble indexes, and send the preamble sequences to the network device on the same PRACH occasion, so that the network device distinguishes the plurality of terminal devices by using the different received preamble sequences. In the following content of this application, a corresponding time domain resource, a corresponding frequency domain resource, and a corresponding code domain resource (namely, a preamble sequence) that are used to send one piece of random access information in one PRACH periodicity are referred to as one PRACH time-frequency-code resource.

The network device broadcasts an available PRACH time-frequency-code resource in a current PRACH periodicity to the terminal device, and there is a mapping relationship between an index of each candidate SSB occasion in the SSB time window and at least one PRACH time-frequency-code resource in the current PRACH periodicity. Different candidate SSB occasions in the SSB time window are mapped to different PRACH time-frequency-code resources in the current PRACH periodicity. Therefore, the terminal device that receives an SSB may determine, based on an SSB index of the SSB (namely, an index of a candidate SSB occasion for sending the SSB) and by using the mapping relationship, a PRACH time-frequency-code resource for sending random access information (for example, a preamble sequence), to send the random access information on the PRACH time-frequency-code resource to request to access a cell. After detecting (receiving) random access information sent on a PRACH time-frequency-code resource, the network device may uniquely determine an SSB detected by a terminal device that sends the random access information on the PRACH time-frequency-code resource. In this way, the network device may send a subsequent message to the terminal device by using a beam used for sending the SSB. The message herein may be, for example, a message 2 (Msg.2) and/or a message 4 (Msg.4) in a random access process.

The following describes a manner of mapping an index of each candidate SSB occasion in the SSB time window to at least one PRACH time-frequency-code resource in the PRACH periodicity. Details are as follows:

One PRACH periodicity may include a plurality of PRACH slots, and one PRACH slot may include a plurality of ROs orthogonal in frequency domain and/or a plurality of ROs orthogonal in time domain. Therefore, the candidate SSB occasion in the SSB time window is mapped to the PRACH time-frequency-code resource in the PRACH periodicity first in ascending order of indexes of preamble sequences on one RO then in ascending order of frequency domain indexes of the ROs in one PRACH slot then in ascending order of time domain indexes of the ROs in one PRACH slot and finally in ascending order of the PRACH slots based on a quantity of preamble sequences that can be carried on each RO, a quantity of candidate SSB occasions included in the SSB time window, and a quantity of preamble sequences, associated with one candidate SSB occasions, on one RO.

Figure 5:
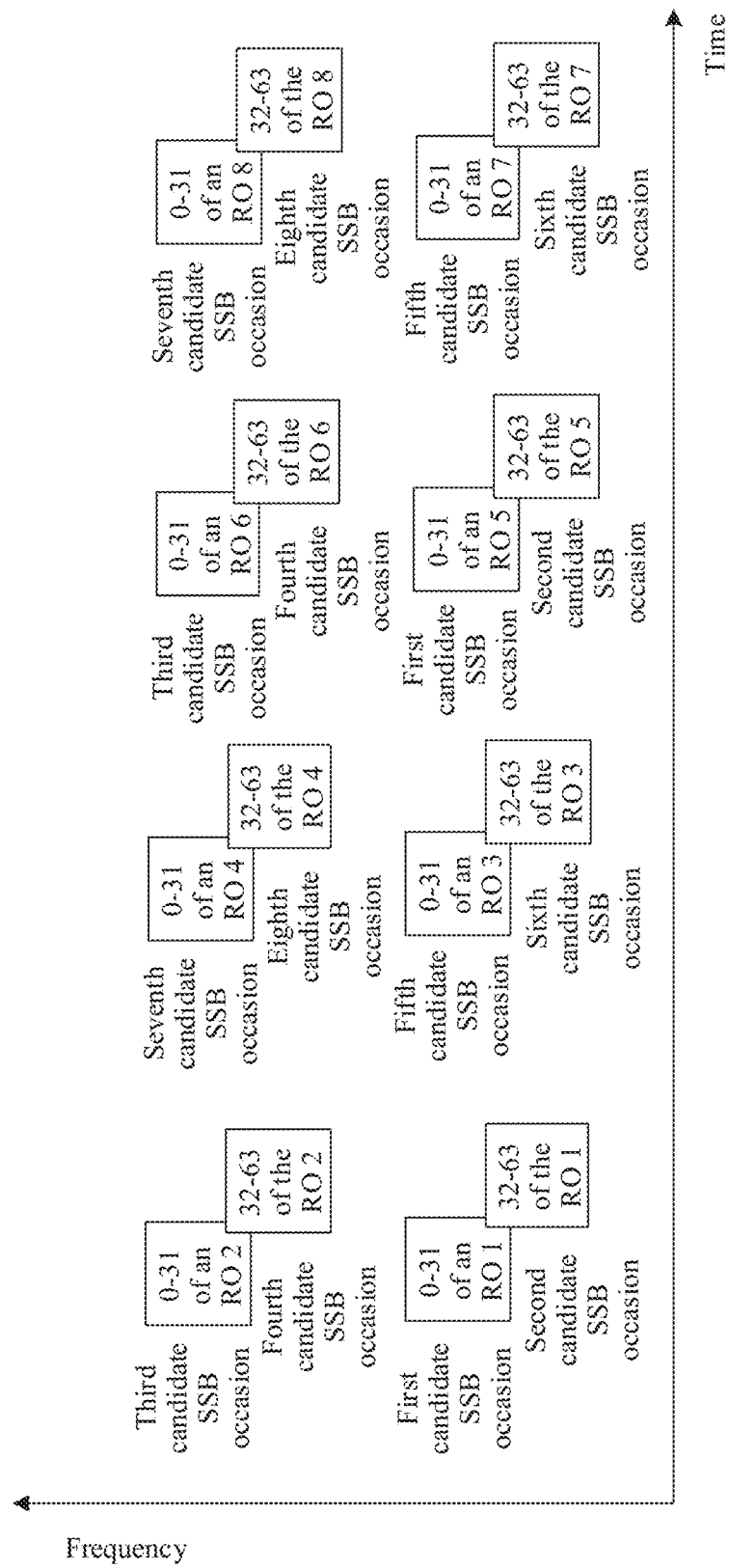
FIG. 5 is a schematic diagram of still another time domain resource according to an embodiment of this application.

FIG. 5 is a schematic diagram of still another time domain resource according to an embodiment of this application. As shown in FIG. 5, for example, an SSB time window includes eight candidate SSB occasions. It is assumed that one PRACH periodicity includes eight ROs, and each RO may carry 64 preamble sequences. One candidate SSB occasion is associated with 32 preamble sequences on one PRACH occasion. In this case, PRACH time-frequency-code resources, in the PRACH periodicity, to which the eight candidate SSB occasions are mapped in ascending order of indexes of the candidate SSB occasions may be shown in FIG. 5.

To resolve a problem that a quantity of available frequency domain resources on a licensed spectrum is relatively small, an NR system may completely work on an unlicensed spectrum without assistance of the licensed spectrum. In other words, in the NR system, uplink/downlink transmission (including transmission on a traffic channel and a control channel) may be performed on the unlicensed spectrum. The NR system working on the unlicensed spectrum may be referred to as a new radio unlicensed (new radio unlicensed, NRU) system. When using the unlicensed spectrum, a network device and a terminal device in the NRU system use a listen-before-talk (Listen-Before-Talk, LBT) channel access mechanism, which is also referred to as a channel sensing mechanism, so that the unlicensed spectrum can be jointly used by the NRU system and another system (for example, a communication system of a different operator or a Wi-Fi network). To be specific, before sending information, the network device or the terminal device needs to sense a channel, and can occupy, only when detecting that the channel is idle (that is, the channel sensing succeeds or the LBT succeeds), the channel to send the information. If detecting that the channel is busy (that is, the channel sensing fails or the LBT fails), the network device or the terminal device cannot occupy the channel to send the information.

In other words, if the network device in the NRU system needs to send L SSBs on L candidate SSB occasions in an SSB time window, the network device first senses the channel before sending the $1^{st}$ SSB on the $1^{st}$ candidate SSB occasion. When determining, through sensing before the $1^{st}$ candidate SSB occasion, that the channel is idle (that is, the channel sensing succeeds or the LBT succeeds), the network device may continuously send the L SSBs on the channel and on the L candidate SSB occasions. When determining, through sensing before the $1^{st}$ candidate SSB occasion, that the channel is busy (that is, the channel sensing fails or the LBT fails), the network device cannot send the $1^{st}$ SSB on the channel and on the $1^{st}$ candidate SSB occasion. Consequently, a terminal device expected to be covered by the SSB cannot receive an SSB signal, and cannot access a network in a current PRACH periodicity. If the network device successfully performs LBT only before a $k^{th}$ candidate SSB occasion in the SSB time window, the network device cannot send the first k−1 SSBs on the channel and on the first k−1 candidate SSB occasions, resulting in a loss of a synchronization signal sending occasion. As a result, a latency of downlink synchronization is excessively high.

To increase an SSB sending occasion, in the NRU system, a quantity (namely, L) of candidate SSB occasions supported in the SSB time window is increased. Based on the prior art, in the NRU system, a maximum quantity of SSBs that need to be actually sent by the network device in the SSB time window may further be defined as M, where M≤L, and M is a positive integer. In this way, if the network device successfully performs LBT before an $i^{th}$ candidate SSB occasion and accesses the channel, the network device may continuously send M SSBs on the $i^{th}$ candidate SSB occasion to an $(i+M-1)^{th}$ candidate SSB occasion. In this scenario, the network device does not continue to occupy a candidate SSB occasion that is in the SSB time window and that is after the $(i+M-1)^{th}$ candidate SSB occasion to send an SSB. Even if the network device successfully performs LBT on an $(L-M+1)^{th}$ candidate SSB occasion in the SSB time window and accesses the channel (where LBT fails before the first L−M candidate SSB occasions), the network device may still send M SSBs on subsequent M candidate SSB occasions, to widely cover terminal devices in a cell. In other words, positions, in the SSB time window, of M candidate SSB occasions actually used by the network device to send the M SSBs slide based on an LBT result.

Figure 6:
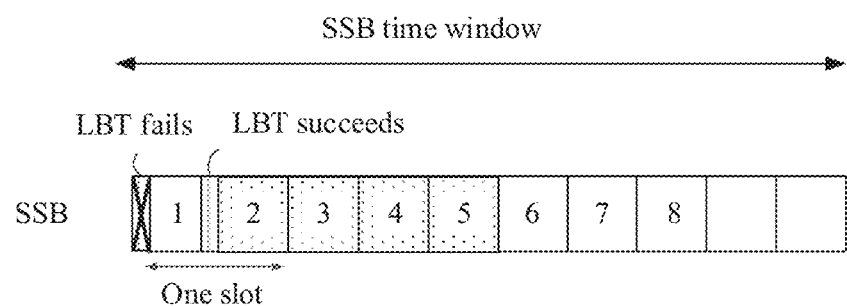
FIG. 6 is a schematic diagram of still another time domain resource according to an embodiment of this application.

FIG. 6 is a schematic diagram of still another time domain resource according to an embodiment of this application. As shown in FIG. 6, for example, a length of an SSB time window is 5 ms. It is assumed that the SSB time window supports a maximum of eight candidate SSB occasions, which are respectively a candidate SSB occasion #1 to a candidate SSB occasion #8. One slot includes two candidate SSB occasions, the eight candidate SSB occasions are located in the first four slots in the SSB time window, and a maximum quantity of SSBs that need to be actually sent by a network device in the SSB time window is 4. In this scenario, it is assumed that the network device fails to perform LBT before the candidate SSB occasion #1 in the first slot, and successfully performs LBT before the candidate SSB occasions in the second slot. In this case, the network device may send four SSBs on the candidate SSB occasion #2 in the first slot, the candidate SSB occasion #3 and the candidate SSB occasion #4 in the second slot, and the candidate SSB occasion #5 in the third slot. A candidate SSB occasion in a subsequent slot is not used.

As described above, there is a mapping relationship between the index of each candidate SSB occasion in the SSB time window and the at least one PRACH time-frequency-code resource in the current PRACH periodicity. In other words, each of the L candidate SSB occasions is mapped to a PRACH time-frequency-code resource. However, the positions, in the SSB time window, of the M candidate SSB occasions actually used by the network device to send the M SSBs slide based on the LBT result. In other words, some candidate SSB occasions in the SSB time window are not used. Because the candidate SSB occasions, in the SSB time window, that are not used to send SSBs are still mapped to PRACH time-frequency-code resources, these PRACH time-frequency-code resources are not used by the terminal device. Consequently, these PRACH time-frequency-code resources are wasted, resulting in relatively low utilization of the PRACH time-frequency-code resources in the PRACH periodicity.

Figure 7:
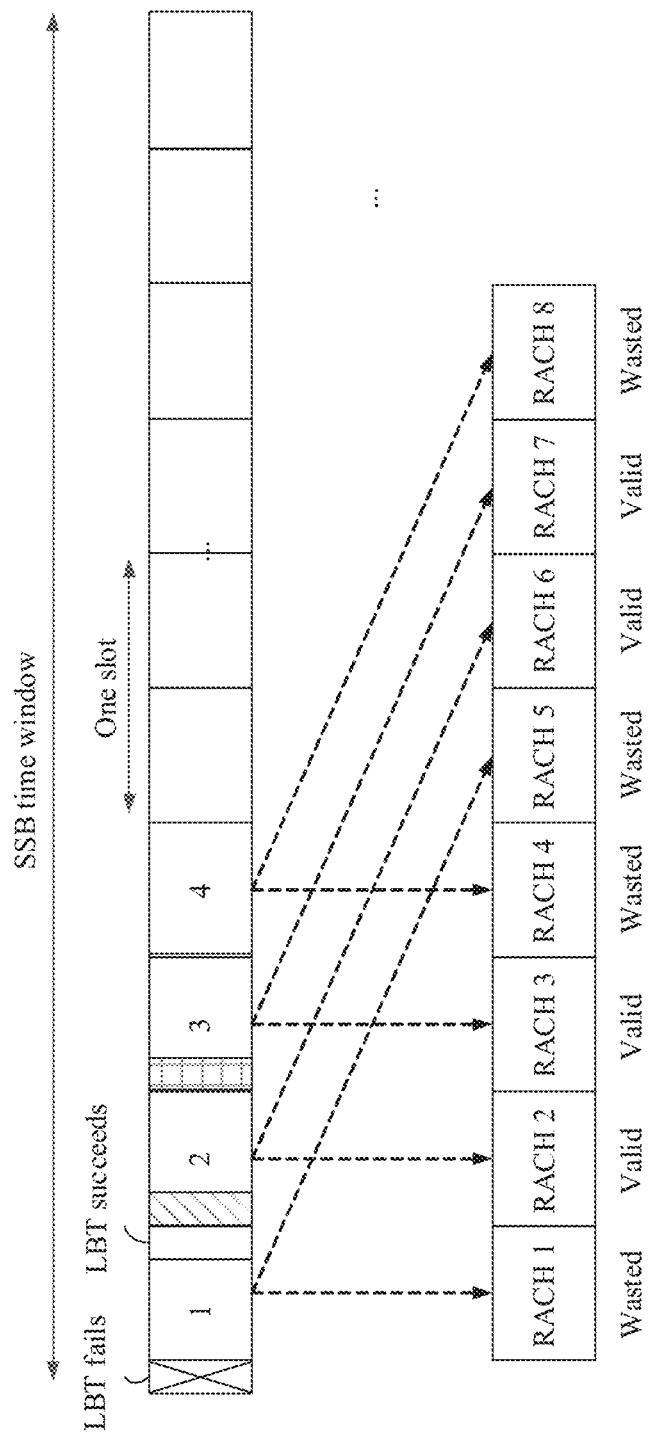
FIG. 7 is a schematic diagram of still another time domain resource according to an embodiment of this application.

FIG. 7 is a schematic diagram of still another time domain resource according to an embodiment of this application. As shown in FIG. 7, for example, a length of an SSB time window is 5 ms. It is assumed that the SSB time window supports a maximum of four candidate SSB occasions, which are respectively a candidate SSB occasion #1 to a candidate SSB occasion #4. One slot includes two candidate SSB occasions, and the four candidate SSB occasions are located in the first two slots in the SSB time window. The candidate SSB occasion #1 is associated with a PRACH time-frequency-code resource 1 (namely, a RACH 1) and a PRACH time-frequency-code resource 5 (namely, a RACH 5) in a current PRACH periodicity, the candidate SSB occasion #2 is associated with a PRACH time-frequency-code resource 2 (namely, a RACH 2) and a PRACH time-frequency-code resource 6 (namely, a RACH 6) in the current PRACH periodicity, the candidate SSB occasion #3 is associated with a PRACH time-frequency-code resource 3 (namely, a RACH 3) and a PRACH time-frequency-code resource 7 (namely, a RACH 7) in the current PRACH periodicity, and the candidate SSB occasion #4 is associated with a PRACH time-frequency-code resource 4 (namely, a RACH 4) and a PRACH time-frequency-code resource 8 (namely, a RACH 8) in the current PRACH periodicity.

It is assumed that a maximum quantity of SSBs that need to be actually sent by the network device in the SSB time window is 2, and the network device fails to perform LBT before the candidate SSB occasion #1, and successfully performs LBT before the candidate SSB occasion 2. In this case, the network device may send two SSBs on the candidate SSB occasion #2 and the candidate SSB occasion #3. The candidate SSB occasion 4 is not used.

In this scenario, the candidate SSB occasion #1 and the candidate SSB occasion #4 in the SSB time window are not used to send an SSB. Therefore, the PRACH time-frequency-code resource 1 (namely, the RACH 1) and the PRACH time-frequency-code resource 5 (namely, the RACH 5) that are associated with the candidate SSB occasion #1 and the PRACH time-frequency-code resource 4 (namely, the RACH 4) and the PRACH time-frequency-code resource 8 (namely, the RACH 8) that are associated with the candidate SSB occasion #4 are not used by the terminal device. Consequently, these PRACH time-frequency-code resources are wasted, resulting in relatively low utilization of the PRACH time-frequency-code resources in the PRACH periodicity.

Considering the foregoing problem, the embodiments of this application provide a random access method, to map two candidate SSB occasions in a same SSB time window to a same PRACH time-frequency-code resource, thereby improving utilization of the PRACH time-frequency-code resource in a PRACH periodicity. The random access method provided in the embodiments of this application may be used in any communications system completely working on an unlicensed spectrum.

The following describes in detail the technical solutions in the embodiments of this application with reference to specific embodiments by using an NRU system as an example. The following several specific embodiments may be combined with each other, and same or similar concepts or processes may not be described repeatedly in some embodiments.

Figure 8:
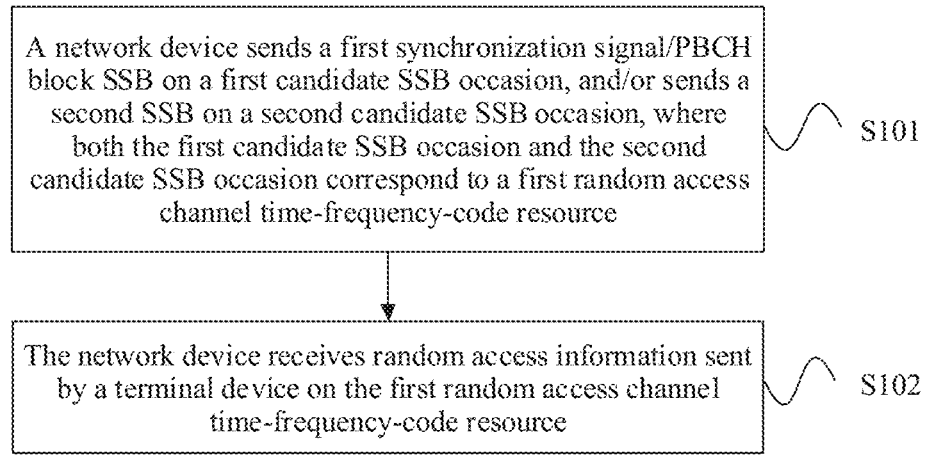
FIG. 8 is a schematic flowchart of a random access method according to an embodiment of this application.

FIG. 8 is a schematic flowchart of a random access method according to an embodiment of this application. As shown in FIG. 8, the method includes the following steps.

S101: A network device sends a first synchronization signal/PBCH block SSB on a first candidate SSB occasion, and/or sends a second SSB on a second candidate SSB occasion, where both the first candidate SSB occasion and the second candidate SSB occasion are associated with a first random access channel time-frequency-code resource.

S102: The network device receives random access information sent by a terminal device on the first random access channel time-frequency-code resource.

Specifically, the first candidate SSB occasion and the second candidate SSB occasion may be different candidate SSB occasions. The term "different" herein separately indicates the following two cases:

In a first case, the first candidate SSB occasion occupies a first time unit in time domain and occupies a first subband in frequency domain. The second candidate SSB occasion occupies a second time unit in time domain and occupies the first subband in frequency domain. In other words, the first candidate SSB occasion and the second candidate SSB occasion correspond to a same subband, but correspond to different time units.

In a second case, the first candidate SSB occasion occupies a first time unit in time domain and occupies a first subband in frequency domain. The second candidate SSB occasion occupies the first time unit in time domain and occupies a second subband in frequency domain. In other words, the first candidate SSB occasion and the second candidate SSB occasion correspond to a same time unit, but correspond to different subbands.

It should be noted that, that the first candidate SSB occasion occupies a first time unit in time domain and occupies a first subband in frequency domain may also be referred to as that the first candidate SSB occasion corresponds to the first time unit in time domain and the first subband in frequency domain, that the first candidate SSB occasion includes the first time unit in time domain and the first subband in frequency domain, that the first candidate SSB occasion is located in the first time unit in time domain and in the first subband in frequency domain, and that the first candidate SSB occasion is carried in the first time unit in time domain and in the first subband in frequency domain.

That the second candidate SSB occasion occupies a second time unit in time domain and occupies the first subband in frequency domain may also be referred to as that the second candidate SSB occasion corresponds to the second time unit in time domain and the first subband in frequency domain, that the second candidate SSB occasion includes the second time unit in time domain and the first subband in frequency domain, that the second candidate SSB occasion is located in the second time unit in time domain and in the first subband in frequency domain, and that the second candidate SSB occasion is carried in the second time unit in time domain and in the first subband in frequency domain.

That the second candidate SSB occasion occupies the first time unit in time domain and occupies a second subband in frequency domain may also be referred to as that the second candidate SSB occasion corresponds to the first time unit in time domain and the second subband in frequency domain, that the second candidate SSB occasion includes the first time unit in time domain and the second subband in frequency domain, that the second candidate SSB occasion is located in the first time unit in time domain and in the second subband in frequency domain, and that the second candidate SSB occasion is carried in the first time unit in time domain and in the second subband in frequency domain.

It should be understood that, a candidate SSB occasion (for example, the first candidate SSB occasion, the second candidate SSB occasion, and any one of L candidate SSB occasions, any candidate SSB occasion in at least two disjoint candidate SSB occasion sets, any candidate SSB occasion in a first candidate SSB occasion set, and any candidate SSB occasion in a second candidate SSB occasion set in the following content of this application) in this embodiment may also be referred to as an SSB occasion or a candidate SSB (Candidate SSB).

It should be understood that the candidate SSB (Candidate SSB) occasion is a sending occasion or a resource that may be used by the network device to send an SSB, or a sending occasion or a resource on which the network device is allowed to send an SSB. Specifically, the network device may determine, based on channel sensing or an implementation algorithm, whether to actually send the SSB on the candidate SSB occasion. More specifically, one SSB time window includes L candidate SSB occasions, and the network device actually occupies only M≤L candidate SSB occasions to send SSBs. For example, considering that the network device needs to perform channel sensing before sending an SSB, and the SSB can be sent only when the channel sensing succeeds, if the channel sensing fails before the candidate SSB occasion, the SSB cannot be sent. For another example, considering a coverage requirement of the network device for a downlink synchronization signal, the network device may not need to occupy a subsequent candidate SSB occasion after sending all of M SSBs. For example, if the network device successfully performs channel sensing before the $1^{st}$ candidate SSB occasion in the L candidate SSB occasions, the network device occupies the first M candidate SSB occasions to send the SSBs, and reserves subsequent L−M candidate SSB occasions as idle instead of continuing to occupy the L−M candidate SSB occasions.

It should be understood that one candidate SSB occasion is used to send one SSB. Different SSBs are sent on different candidate SSB occasions. In addition, "used to send" means that a protocol or a regulation supports the network device in using or allows the network device to use the candidate SSB occasion to send the SSB. The network device may use the candidate SSB occasion to send the SSB, or may not use the candidate SSB occasion to send the SSB. For example, when the network device successfully performs LBT before the candidate SSB occasion, the network device uses the candidate SSB occasion to send the SSB. When the network device fails to perform LBT before the candidate SSB occasion, the network device does not use the candidate SSB occasion to send the SSB. Alternatively, when the network device has sent enough SSBs before the candidate SSB occasion in the SSB time window, the network device may not use the candidate SSB occasion to send the SSB.

It should be understood that, in this embodiment, that a candidate SSB occasion is associated with (associate with) a random access channel time-frequency-code resource (for example, a first random access channel time-frequency-code resource or a random access channel time-frequency-code resource in a random access time-frequency-code resource set) may also be referred to as that a candidate SSB occasion is mapped (map) to a random access channel time-frequency-code resource.

It should be understood that the random access channel time-frequency-code resource may be one preamble sequence on one PRACH occasion, may include a plurality of preamble sequences on a plurality of PRACH occasions (where each PRACH occasion carries at least one preamble sequence), or may include a plurality of preamble sequences on one PRACH occasion.

It should be understood that a time unit (for example, the first time unit or the second time unit) in this embodiment of this application may include at least one time domain symbol.

Optionally, the time unit may be a time domain resource, for example, four time domain symbols, that is occupied for sending one SSB. The time unit may alternatively include a time domain resource occupied for sending one SSB and another time domain resource, and for example, the time unit is half slot (namely, time domain symbols #0 to #6 or time domain symbols #7 to #13 in one slot, also referred to as a group of time domain symbols in one slot) including a candidate SSB occasion for sending the SSB.

Optionally, the time unit may be a time domain unit that carries downlink synchronization information including the SSB. The downlink synchronization information herein may be an SSB, or may include an SSB and system information. The system information may be, for example, remaining minimum system information (remaining minimum system information, RMSI).

It should be understood that a subband (for example, the first subband or the second subband) in this embodiment of this application may be a frequency domain unit that carries information sent by the network device.

Optionally, the subband may include one or more subcarriers (subcarrier), in other words, the subband may include one or more physical resource blocks (physical resource block, PRB), in other words, the subband may be a frequency domain resource corresponding to a bandwidth of 5 MHz, 10 MHz, 15 MHz, or 20 MHz (where for example, the subband may be a frequency domain resource occupied by one carrier in an NRU system). In some embodiments, the subband may also be referred to as a carrier, a bandwidth part (bandwidth part, BWP), or an initial active downlink bandwidth part (initial active DL BWP).

Optionally, the subband may be a frequency domain unit used to carry downlink synchronization information including the SSB.

Optionally, the subband may be a frequency domain unit used by the network device to perform channel sensing. For example, the network device separately performs channel sensing procedures in different subbands. To be specific, the network device performs a channel sensing procedure in the first subband, and performs another independent channel sensing procedure in the second subband; or maintains a CWS in the first subband, and maintains another independent CWS in the second subband. Alternatively, when performing channel sensing, the network device compares energy or power detected in a sensing slot and in the subband with a sensing threshold CCA-ED corresponding to the subband, to determine whether a channel is busy or idle (where whether a channel is in a busy or idle state is independently determined in another subband). Alternatively, the network device can occupy, only after successfully performing LBT in the subband, the subband to send information (where whether LBT succeeds is independently determined in another subband).

Optionally, the subband may be a frequency domain unit used by the terminal device to perform channel measurement. For example, the terminal device performs channel measurement at a granularity of a subband. The channel measurement herein may include channel quality indicator (channel quality indicator, CQI)/precoding matrix indicator (precoding matrix indicator, PMI) measurement or radio resource management (radio resource management, RRM) measurement. In other words, the terminal device reports a result of the CQI/PMI/RRM measurement in a unit of a subband. In other words, the terminal device performs CQI/PMI/RRM measurement within a range of one subband instead of performing cross-subband measurement.

Optionally, the first candidate SSB occasion and the second candidate SSB occasion are candidate SSB occasions in a same SSB sending periodicity or a same SSB time window.

In this embodiment, both the first candidate SSB occasion and the second candidate SSB occasion in the same SSB time window are associated with a first PRACH time-frequency-code resource. The first PRACH time-frequency-code resource herein may include one preamble sequence on one PRACH occasion, may include a plurality of preamble sequences on a plurality of PRACH occasions (where each PRACH occasion may carry at least one preamble sequence), or may include a plurality of preamble sequences on one PRACH occasion.

Optionally, that the first candidate SSB occasion is associated with the first PRACH time-frequency-code resource may be understood as that the first candidate SSB occasion or an index of the first candidate SSB occasion is mapped to the first PRACH time-frequency-code resource. Similarly, that the second candidate SSB occasion is associated with the first PRACH time-frequency-code resource may be understood as that the second candidate SSB occasion or an index of the second candidate SSB occasion is mapped to the first PRACH time-frequency-code resource. In other words, mapping of a candidate SSB occasion to a PRACH time-frequency-code resource is mapping of an index of the candidate SSB occasion to the PRACH time-frequency-code resource. The index of the candidate SSB occasion herein may be an index that is of the candidate SSB occasion in the L candidate SSB occasions included in the SSB time window and that is sorted in time order. The index of the candidate SSB occasion is consistent with an SSB index of an SSB sent on the candidate SSB occasion. The SSB index may be indicated to the terminal device by using "a DMRS sequence" or "a DMRS sequence+bit information on a PBCH" carried in the SSB. For details, refer to the foregoing descriptions.

It should be understood that, that both the first candidate SSB occasion and the second candidate SSB occasion are mapped to the first PRACH time-frequency-code resource may be understood as that the first candidate SSB occasion is mapped to a PRACH time-frequency-code resource set A, and the first PRACH time-frequency-code resource is a subset of the PRACH time-frequency-code resource set A; and the second candidate SSB occasion is mapped to a PRACH time-frequency-code resource set B, and the first PRACH time-frequency-code resource is a subset of the PRACH time-frequency-code resource set B. Further, the PRACH time-frequency-code resource set A is all PRACH time-frequency-code resources (configured by the network device) to which the first candidate SSB occasion is mapped, or the PRACH time-frequency-code resource set A is all PRACH time-frequency-code resources (configured by the network device), in one PRACH periodicity, to which the first candidate SSB occasion is mapped. Similarly, the PRACH time-frequency-code resource set B is all PRACH time-frequency-code resources (configured by the network device) to which the second candidate SSB occasion is mapped, or the PRACH time-frequency-code resource set B is all PRACH time-frequency-code resources (configured by the network device), in the PRACH periodicity, to which the second candidate SSB occasion is mapped.

Optionally, the PRACH time-frequency-code resource set A and the PRACH time-frequency-code resource set B may not be completely the same. To be specific, the PRACH time-frequency-code resources to which the first candidate SSB occasion is mapped partially overlap the PRACH time-frequency-code resources to which the second candidate SSB occasion is mapped. In this case, the first PRACH time-frequency-code resource is a time-frequency-code resource to which the first candidate SSB occasion and the second candidate SSB occasion are both mapped. For example, the first candidate SSB occasion is mapped to preamble sequences #1 to #32 of a PRACH occasion #A and preamble sequences #1 to #32 of a PRACH occasion #B, the second candidate SSB occasion is mapped to preamble sequences #1 to #64 of the PRACH occasion #A, and the first PRACH time-frequency-code resource is the preamble sequences #1 to #32 of the PRACH occasion #A.

Optionally, the PRACH time-frequency-code resource set A and the PRACH time-frequency-code resource set B may be completely the same. To be specific, all the PRACH time-frequency-code resources to which the first candidate SSB occasion is mapped are completely the same as all the PRACH time-frequency-code resources to which the second candidate SSB occasion is mapped. In this case, the PRACH time-frequency-code resource set A and the PRACH time-frequency-code resource set B may be referred to as the first PRACH time-frequency-code resource. For example, both the first candidate SSB occasion and the second candidate SSB occasion are mapped to preamble sequences #1 to #32 of a PRACH occasion #A and preamble sequences #1 to #32 of a PRACH occasion #B. In this case, the first PRACH time-frequency-code resource is the preamble sequences #1 to #32 of the PRACH occasion #A and the preamble sequences #1 to #32 of the PRACH occasion #B.

In the foregoing manner of mapping two candidate SSB occasions in a same SSB time window to a same PRACH time-frequency-code resource, even if the network device fails to perform channel sensing before one of the two candidate SSB occasions, but sends an SSB after successfully performing channel sensing before the other candidate SSB occasion, the first PRACH time-frequency-code resource can still be used by a terminal device that detects the SSB, to send random access information, thereby avoiding a waste of PRACH resources. It should be understood that the random access information herein may also be referred to as PRACH information, a preamble (Preamble), a preamble sequence, a message 1 (message 1, Msg.1), or the like.

For example, if the network device fails to perform LBT before the first candidate SSB occasion but successfully performs LBT before the second candidate SSB occasion, the network device may send the second SSB on the second candidate SSB occasion. A terminal device that detects the second SSB may determine, based on a mapping relationship between a candidate SSB occasion and a PRACH time-frequency-code resource, the first PRACH time-frequency-code resource associated with the second candidate SSB occasion used to send the second SSB, to send the random access information (namely, a codeword resource in the first PRACH time-frequency-code resource) to the network device on the first PRACH time-frequency-code resource, thereby avoiding a case in which the first PRACH time-frequency-code resource to which the first candidate SSB occasion is mapped is wasted because the network device cannot send the first SSB on the first candidate SSB occasion.

The following describes, with reference to the two cases in which the first candidate SSB occasion is different from the second candidate SSB occasion, how the first candidate SSB occasion and the second candidate SSB occasion are mapped to a same PRACH time-frequency-code resource and how the terminal device sends an SSB based on an LBT result. Details are as follows:

In the first case, the first candidate SSB occasion and the second candidate SSB occasion correspond to a same subband, but correspond to different time units. To be specific, the first candidate SSB occasion occupies the first time unit in time domain and occupies the first subband in frequency domain. The second candidate SSB occasion occupies the second time unit in time domain and occupies the first subband in frequency domain.

In this embodiment, to improve an SSB sending success probability, the network device may map different candidate SSB occasions in the SSB time window to a same PRACH time-frequency-code resource. Even if an SSB cannot be sent on one of the candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

Figure 9:
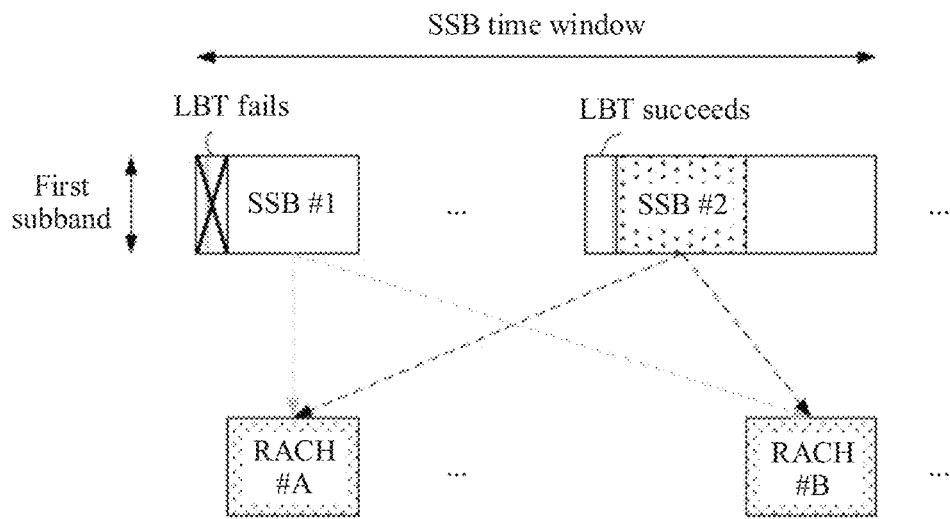
FIG. 9 is a schematic diagram of still another time domain resource according to an embodiment of this application.

FIG. 9 is a schematic diagram of still another time domain resource according to an embodiment of this application. As shown in FIG. 9, for example, the first candidate SSB occasion (namely, an SSB #1) is located before the second candidate SSB occasion (namely, an SSB #2). In other words, the first time unit occupied by the first candidate SSB occasion is earlier than the second time unit occupied by the second candidate SSB occasion. Both the first candidate SSB occasion and the second candidate SSB occasion that correspond to different time units are mapped to the first PRACH time-frequency-code resource (namely, a RACH #A and a RACH #B). When the network device fails to perform LBT before the first candidate SSB occasion, but successfully performs LBT before the second candidate SSB occasion, the second candidate SSB occasion is also mapped to the RACH #A and the RACH #B, to avoid a waste of the two RACH resources that is caused because that the first candidate SSB occasion is not occupied.

In this scenario, that the terminal device sends the SSB based on the LBT result may include the following several cases:

When the network device successfully performs channel sensing before the first candidate SSB occasion but fails to perform channel sensing before the second candidate SSB occasion, the network device sends the first SSB to the terminal device on the first candidate SSB occasion, and does not send the second SSB to the terminal device on the second candidate SSB occasion. In this way, after detecting the first SSB, the terminal device may occupy the RACH #A and/or the RACH #B to send the random access information. Compared with a manner in which only the second SSB is mapped to the RACH #A and the RACH #B resources, this manner can avoid a waste of PRACH resources.

Alternatively, when the network device fails to perform channel sensing before the first candidate SSB occasion but successfully performs channel sensing before the second candidate SSB occasion, the network device sends the second SSB to the terminal device on the second candidate SSB occasion, and does not send the first SSB to the terminal device on the first candidate SSB occasion. In this way, after detecting the second SSB, the terminal device may occupy the RACH #A and/or the RACH #B to send the random access information. Compared with a manner in which only the first SSB is mapped to the RACH #A and the RACH #B resources, this manner can avoid a waste of PRACH resources.

When the network device successfully performs channel sensing before the first candidate SSB occasion and before the second candidate SSB occasion, the network device sends the first SSB to the terminal device on the first candidate SSB occasion, and does not send the second SSB to the terminal device on the second candidate SSB occasion; or the network device sends the second SSB to the terminal device on the second candidate SSB occasion, and does not send the first SSB to the terminal device on the first candidate SSB occasion; or the network device sends the first SSB to the terminal device on the first candidate SSB occasion, and sends the second SSB to the terminal device on the second candidate SSB occasion.

Usually, in an existing NR system, a network device sends different SSBs on different candidate SSB occasions and in different beam directions. If a plurality of candidate SSB occasions are mapped to a same PRACH time-frequency-code resource, after receiving random access information sent by a terminal device based on a detected SSB, the network device may fail to identify the SSB that is detected by the terminal device and based on which the random access information is sent, and further fail to determine a beam direction of a subsequent downlink signal.

Correspondingly, in this embodiment, if the network device successfully performs channel sensing before both the first candidate SSB occasion and the second candidate SSB occasion, and as in the prior art, sends the first SSB and the second SSB by using different beams, a problem that a definite beam direction cannot be determined is also caused. To enable the network device to distinguish beam directions, the following constraint may further be imposed in this embodiment of this application:

When the network device sends the first SSB on the first candidate SSB occasion, and sends the second SSB on the second candidate SSB occasion, a beam direction in which the network device sends the first SSB is the same as a beam direction in which the network device sends the second SSB.

To avoid the problem that a definite beam direction cannot be determined, the network device may send an SSB on only one candidate SSB occasion. In this way, one PRACH resource may still be uniquely associated with the SSB actually sent by the network device, so that the network device can obtain a beam direction used for the actually sent SSB, and send subsequent downlink information in the beam direction or a beam direction approximate to the beam direction.

Alternatively, the network device sends SSBs on these candidate SSB occasions, for example, sends the first SSB on the first candidate SSB occasion and sends the second SSB on the second candidate SSB occasion, in a same beam direction or approximate beam directions. In this way, any one or more SSBs, in a plurality of SSBs, detected by the terminal device may be mapped to a same PRACH resource to send PRACH information. After the network device receives the PRACH information, although the PRACH information is associated with a plurality of candidate SSB occasions, because a same beam direction (for example, a beam direction A) is used for the candidate SSB occasions, the network device may send subsequent downlink information to the terminal device in the beam direction A or a beam direction approximate to the beam direction A. In this way, the beam direction of the subsequent downlink information is the same as or approximate to a beam direction of the SSB.

In this embodiment, there is an interval of at least one candidate SSB occasion between the first candidate SSB occasion and the second candidate SSB occasion. For example, there is an interval of M−1 candidate SSB occasions between the first candidate SSB occasion and the second candidate SSB occasion. Specifically, the M−1 candidate SSB occasions herein are candidate SSB occasions on which the network device is allowed to send SSBs, or candidate SSB occasions configured by the network device that are used to send SSBs. For example, the network device configures to send an SSB on a part of all available candidate SSB occasions in the SSB time window. More specifically, M herein is a maximum quantity of SSBs that are allowed to be sent by the network device in an SSB sending periodicity, in other words, a maximum quantity of SSBs that are allowed to be sent by the network device in the SSB time window. For example, even if there is an available candidate SSB occasion subsequently, the network device does not continue to send an SSB after sending all the M SSBs in the SSB sending periodicity or the SSB time window. M may be configured by the network device for the terminal device by using broadcast information. For example, M may be notified by the network device to the terminal device by using a PBCH or RMSI.

In other words, in this embodiment of the present invention, not all candidate SSB occasions in the SSB time window are mapped to a same PRACH time-frequency-code resource, but a part of the candidate SSB occasions in the SSB time window are mapped to a same PRACH time-frequency-code resource, and a PRACH time-frequency-code resource to which the other part of the candidate SSB occasions are mapped is different from the PRACH time-frequency-code resource to which the part of the candidate SSB occasions are mapped.

Optionally, the candidate SSB occasions supported in the SSB time window may include at least two candidate SSB occasion sets, and the at least two candidate SSB occasion sets include a first candidate SSB occasion set and a second candidate SSB occasion set. The first candidate SSB occasion set includes at least two candidate SSB occasions, and the second candidate SSB occasion set includes at least two candidate SSB occasions. The first candidate SSB occasion is a candidate SSB occasion in the first candidate SSB occasion set, and the second candidate SSB occasion is a candidate SSB occasion in the second candidate SSB occasion set. Further, the at least two candidate SSB occasion sets are disjoint from each other.

In this case, different candidate SSB occasions in the first candidate SSB occasion set are mapped to different PRACH time-frequency-code resources in a PRACH time-frequency-code resource set (that is, a set including available PRACH time-frequency-code resources in the PRACH periodicity), and different candidate SSB occasions in the second candidate SSB occasion set are mapped to different PRACH time-frequency-code resources in the PRACH time-frequency-code resource set. A candidate SSB occasion in the first candidate SSB occasion set and a candidate SSB occasion in the second candidate SSB occasion set may be mapped to a same PRACH time-frequency-code resource in the PRACH time-frequency-code resource set. In this case, the first candidate SSB occasion and the second candidate SSB occasion are mapped to a same PRACH time-frequency-code resource.

It should be understood that the PRACH time-frequency-code resource set is also referred to as a random access time-frequency-code resource set.

Optionally, the L candidate SSB occasions include at least two disjoint candidate SSB occasion sets. In other words, all candidate SSB occasions included in the at least two disjoint candidate SSB occasion sets are all the L candidate SSB occasions.

Optionally, when the first candidate SSB occasion and the second candidate SSB occasion are included in the L candidate SSB occasions, and L is greater than or equal to a first threshold, the L candidate SSB occasions include the at least two disjoint candidate SSB occasion sets each of which does not include the other. In other words, the L candidate SSB occasions consist of the at least two disjoint candidate SSB occasion sets. Any one of the at least two disjoint candidate SSB occasion sets includes at least one candidate SSB occasion adjacent in a time sequence, namely, at least one candidate SSB occasion whose relative rank is adjacent in the L candidate SSB occasions.

Further, any one of the at least two disjoint candidate SSB occasion sets includes at least two candidate SSB occasions adjacent in the time sequence.

For example, when L is equal to 2, each of the two candidate SSB occasions is a candidate SSB occasion set, and each candidate SSB occasion set includes one candidate SSB occasion. When L is equal to 3, the three candidate SSB occasions may include two candidate SSB occasion sets, one candidate SSB occasion set includes two candidate SSB occasions adjacent in the time sequence, and the other candidate SSB occasion set includes the remaining candidate SSB occasion. When L is equal to 4, the four candidate SSB occasions may include two candidate SSB occasion sets, one candidate SSB occasion set includes two candidate SSB occasions adjacent in the time sequence, and the other candidate SSB occasion set includes the remaining two candidate SSB occasions adjacent in the time sequence. The rest can be deduced by analogy. A specific quantity of candidate SSB occasion sets included in the L candidate SSB occasions may be determined based on a value of L and a size of one candidate SSB occasion set.

In this scenario, any two different candidate SSB occasions in any one of the at least two disjoint candidate SSB occasion sets are associated with different PRACH time-frequency-code resources, in other words, different candidate SSB occasions in a same candidate SSB occasion set are mapped to different PRACH time-frequency-code resources in the PRACH time-frequency-code resource set. The first candidate SSB occasion and the second candidate SSB occasion are included in different candidate SSB occasion sets in the at least two disjoint candidate SSB occasion sets. In this case, the first candidate SSB occasion and the second candidate SSB occasion are mapped to a same PRACH time-frequency-code resource.

It should be understood that any two different candidate SSB occasions in any one of the at least two disjoint candidate SSB occasion sets are associated with different PRACH time-frequency-code resources. Candidate SSB occasions included in the candidate SSB occasion set are associated with PRACH time-frequency-code resources that do not overlap each other, in other words, there is no intersection between PRACH time-frequency-code resources to which any two candidate SSB occasions included in the candidate SSB occasion set are mapped, in other words, any two candidate SSB occasions included in the candidate SSB occasion set are mapped to orthogonal PRACH time-frequency-code resources, in other words, two groups of PRACH time-frequency-code resources to which any two candidate SSB occasions included in the candidate SSB occasion set are mapped do not include a same preamble sequence on a same PRACH occasion.

In the foregoing embodiment, the L candidate SSB occasions are candidate SSB occasions included in a same SSB sending periodicity or a same SSB time window.

Optionally, the L candidate SSB occasions may be all candidate SSB occasions included in the SSB sending periodicity or the SSB time window.

Optionally, the L candidate SSB occasions are candidate SSB occasions consecutive (namely, adjacent) in the time sequence. For example, if L is 4, the L candidate SSB occasions may be a candidate SSB occasion 1, a candidate SSB occasion 2, a candidate SSB occasion 3, and a candidate SSB occasion 4.

Optionally, the L candidate SSB occasions may be some candidate SSB occasions included in the SSB sending periodicity or the SSB time window. For example, the network device configures to use some of all available candidate SSB occasions in the SSB time window, so that the network device does not occupy a remaining candidate SSB occasion to send an SSB. For example, the configuration herein is configuration performed by using RMSI or a PBCH.

Further, the L candidate SSB occasions are candidate SSB occasions non-consecutive (namely, nonadjacent) in the time sequence. For example, if L is 4, the L candidate SSB occasions may be a candidate SSB occasion 1, a candidate SSB occasion 3, a candidate SSB occasion 5, and a candidate SSB occasion 7.

Optionally, a time sequence of a candidate SSB occasion is a relative time rank of the candidate SSB occasion in the L candidate SSB occasions, and a time sequence index of the candidate SSB occasion is an index of the relative time rank of the candidate SSB occasion in the L candidate SSB occasions.

Optionally, the time sequence of the candidate SSB occasion is a time rank of the candidate SSB occasion in the SSB time window or the SSB periodicity.

Optionally, the time sequence of the candidate SSB occasion is a value rank of an index of the candidate SSB occasion. The index of the candidate SSB occasion is an index of the candidate SSB occasion in the SSB time window. In other words, the time sequence of the candidate SSB occasion is an index of a time unit in which the candidate SSB occasion is located, for example, a rank of the slot. The index of the candidate SSB occasion is also referred to as an SSB index (SSB index).

It should be understood that the L candidate SSB occasions are sorted in ascending order based on the time sequence (where for example, candidate SSB occasion indexes of the L candidate SSB occasions are from 0 to L−1); or indexes of the candidate SSB occasions are notified by the network device by using broadcast information.

It should be understood that, that any one of the at least two disjoint candidate SSB occasion sets includes at least one candidate SSB occasion adjacent in a time sequence means that an index of the at least one candidate SSB occasion included in the candidate SSB occasion set is adjacent in the L candidate SSB occasions, in other words, the at least one candidate SSB occasion is adjacent or consecutive in a relative time sequence in the L candidate SSB occasions. To be specific, all candidate SSB occasions in any one of the at least two disjoint candidate SSB occasion sets are earlier than or later than all candidate SSB occasions in any other candidate SSB occasion set. For example, the L candidate SSB occasions may be a candidate SSB occasion 1, a candidate SSB occasion 3, a candidate SSB occasion 5, and a candidate SSB occasion 7, and include two candidate SSB occasion sets, namely, {the candidate SSB occasion 1, the candidate SSB occasion 3} and {the candidate SSB occasion 5, the candidate SSB occasion 7}. In this case, the candidate SSB occasion 1 and the candidate SSB occasion 3 in the $1^{st}$ candidate SSB occasion set are adjacent in the time sequence, and the candidate SSB occasion 5 and the candidate SSB occasion 7 in the $2^{nd}$ candidate SSB occasion set are adjacent in the time sequence.

Further, that any one of the at least two disjoint candidate SSB occasion sets includes at least one candidate SSB occasion adjacent in a time sequence means that a time unit in which the at least one candidate SSB occasion included in the candidate SSB occasion set is located is adjacent or consecutive. For example, the time unit herein is the foregoing half slot that is used to carry one SSB. For example, the L candidate SSB occasions may be a candidate SSB occasion 1 to a candidate SSB occasion 8, are carried in a slot 1 to a slot 4, and include two candidate SSB occasion sets, namely, {the candidate SSB occasion 1 to the candidate SSB occasion 4} and {the candidate SSB occasion 5 to the candidate SSB occasion 8}. In this case, the four candidate SSB occasions in the 1st candidate SSB occasion set are adjacent in the time sequence, and the four candidate SSB occasions are respectively carried in four consecutive time units, namely, time domain symbols #0 to #6 and time domain symbols #7 to #13 in a slot 1, and time domain symbols #0 to #6 and time domain symbols #7 to #13 in a slot 2; the four candidate SSB occasions in the 2nd candidate SSB occasion set are adjacent in the time sequence, and the four candidate SSB occasions are respectively carried in four consecutive time units, namely, time domain symbols #0 to #6 and time domain symbols #7 to #13 in a slot 3, and time domain symbols #0 to #6 and time domain symbols #7 to #13 in a slot 4.

Alternatively, that any candidate SSB occasion set includes at least one candidate SSB occasion adjacent in the time sequence may also mean that an index of the at least one candidate SSB occasion included in the candidate SSB occasion set is adjacent or consecutive.

Similarly, the following M candidate SSB occasions adjacent in the time sequence mean that the M candidate SSB occasions are adjacent or consecutive in the relative time sequence in the L candidate SSB occasions. Any other candidate SSB occasion included in the L candidate SSB occasions is earlier than or later than the M candidate SSB occasions. Further, time units in which the M candidate SSB occasions are located are adjacent or consecutive, or indexes of the M candidate SSB occasions are adjacent or consecutive.

In a possible implementation, each of the at least two disjoint candidate SSB occasion sets includes M candidate SSB occasions adjacent in the time sequence, and the candidate SSB occasions in any one of the at least two disjoint candidate SSB occasion sets are sequentially associated with PRACH time-frequency-code resources in a PRACH time-frequency-code resource set (namely, a set of available PRACH time-frequency-code resources in the PRACH periodicity) based on indexes of the candidate SSB occasions. The PRACH time-frequency-code resource set includes at least one time-frequency-code resource used by the terminal device to send the random access information.

It should be understood that, that candidate SSB occasions in a candidate SSB occasion set are sequentially mapped to PRACH time-frequency-code resources in a PRACH time-frequency-code resource set may be as follows: The candidate SSB occasions in the candidate SSB occasion set are sequentially mapped to the PRACH time-frequency-code resources in the PRACH time-frequency-code resource set based on indexes of the candidate SSB occasions or time ranks of the candidate SSB occasions. For example, as in the prior art, the candidate SSB occasions in the candidate SSB occasion set may be sorted in ascending order or descending order of indexes (or time sequence indexes of the candidate SSB occasions in the candidate SSB occasion set), and mapped to PRACH time-frequency-code resources in the PRACH periodicity first in ascending order of indexes of preamble sequences on one RO then in ascending order of frequency domain indexes of ROs in one PRACH slot then in ascending order of time domain indexes of ROs in one PRACH slot and finally in ascending order of PRACH slots.

To be specific, M is used as a division unit, and every M candidate SSB occasions whose relative ranks are adjacent are grouped into a same candidate SSB occasion set by starting from the 1st candidate SSB occasion in the L candidate SSB occasions. M candidate SSB occasions in a same candidate SSB occasion set are separately mapped to different PRACH time-frequency-code resources, and two candidate SSB occasions belonging to different candidate SSB occasion sets may be mapped to a same PRACH time-frequency-code resource.

Further, M is greater than or equal to 2.

Considering that on an unlicensed spectrum, the network device usually sends a plurality of SSBs in mutually different beam directions and on M candidate SSB occasions (namely, a quantity of candidate SSB occasions included in one candidate SSB occasion set) that are consecutive in terms of time in one SSB time window, to cover all areas in a cell. If an SSB fails to be sent on a candidate SSB occasion (for example, the first candidate SSB occasion) in a candidate SSB occasion set due to a channel sensing failure, channel sensing may be performed before a candidate SSB occasion (for example, the second candidate SSB occasion), in a next candidate SSB occasion set, mapped to a same PRACH time-frequency-code resource to which the candidate SSB occasion is mapped. If the channel sensing succeeds, an SSB may be sent on the second candidate SSB occasion. In this case, the network device may send the SSB on the second candidate SSB occasion and in a beam direction the same as that used for the first candidate SSB occasion. In this manner, an equivalent coverage effect can be achieved.

In this scenario, all the candidate SSB occasions in the candidate SSB occasion set are mapped to all the available PRACH time-frequency-code resources in the PRACH time-frequency-code resource set. In other words, all candidate SSB occasions in one candidate SSB occasion set occupy all available PRACH time-frequency-code resources in one PRACH periodicity. In this way, the network device sends SSBs on all the candidate SSB occasions in the candidate SSB occasion set, to ensure that PRACH resources are not wasted. If an SSB fails to be sent on a candidate SSB occasion in the candidate SSB occasion set due to channel sensing, but channel sensing succeeds before a candidate SSB occasion, in a next candidate SSB occasion set, mapped to a same PRACH time-frequency-code resource to which the candidate SSB occasion is mapped and an SSB is sent, it can be ensured that the PRACH resource is not wasted.

Further, candidate SSB occasions having a same time sequence index in any two candidate SSB occasion sets are mapped to a same PRACH time-frequency-code resource. To be specific, candidate SSB occasions having a same time sequence index in different candidate SSB occasion sets in the at least two disjoint candidate SSB occasion sets are associated with a same PRACH time-frequency-code resource, and a time sequence index of the first candidate SSB occasion is the same as a time sequence index of the second candidate SSB occasion. In this way, regardless of which candidate SSB occasion, in the SSB time window, used by the network device to start to send an SSB, as long as the network device sends M SSBs on M consecutive candidate SSB occasions, it can be ensured that the M SSBs are mapped to the entire PRACH time-frequency-code resource set, to avoid a waste of PRACH time-frequency-code resources.

It should be understood that the time sequence index of the candidate SSB occasion may be a time sequence index of a time unit in which the candidate SSB occasion is located in time units included in the candidate SSB occasion set. The time sequence index of the candidate SSB occasion in the candidate SSB occasion set may also be referred to as an index of the candidate SSB occasion, in the candidate SSB occasion set, sorted in time order. Alternatively, the time sequence index of the candidate SSB occasion in the candidate SSB occasion set may also be referred to as an index of the candidate SSB occasion, in the candidate SSB occasion set, sorted in ascending order of SSB indexes. In other words, the time sequence index of the candidate SSB occasion is a time sequence position or a relative time sequence position of the candidate SSB occasion in the candidate SSB occasion set.

For example, the L candidate SSB occasions include at least two candidate SSB occasion sets including the foregoing candidate SSB occasion set. A $k^{th}$ candidate SSB occasion in candidate SSB occasions sorted based on the time sequence in the candidate SSB occasion set and a $k^{th}$ candidate SSB occasion in candidate SSB occasions sorted based on the time sequence in any other candidate SSB occasion set are mapped to a same PRACH time-frequency-code resource, where k is a positive integer less than or equal to M.

For another example, the L candidate SSB occasions may be a candidate SSB occasion 1 to a candidate SSB occasion 8, are sequentially carried in a slot 1 to a slot 4, and include two candidate SSB occasion sets, namely, {the candidate SSB occasion 1 to the candidate SSB occasion 4} and {the candidate SSB occasion 5 to the candidate SSB occasion 8}. In this case, indexes of the candidate SSB occasion 1 and the candidate SSB occasion 5 are the same (where both the candidate SSB occasion 1 and the candidate SSB occasion 5 are candidate SSB occasions whose time is the earliest in the candidate SSB occasion sets in which the candidate SSB occasion 1 and the candidate SSB occasion 5 are respectively located), indexes of the candidate SSB occasion 2 and the candidate SSB occasion 6 are the same, indexes of the candidate SSB occasion 3 and the candidate SSB occasion 7 are the same, and indexes of the candidate SSB occasion 4 and the candidate SSB occasion 8 are the same.

In other words, the L candidate SSB occasions are periodically and sequentially associated with random access channel time-frequency-code resources in a time-frequency-code resource set based on indexes of the candidate SSB occasions and by using M candidate SSB occasions adjacent in the time sequence as a mapping periodicity, any two candidate SSB occasions belonging to a same mapping periodicity that are in the L candidate SSB occasions are associated with different random access channel time-frequency-code resources in the PRACH time-frequency-code resource set, and the first SSB and the second SSB are sent on candidate SSB occasions in different mapping periodicities (in other words, the first candidate SSB occasion and the second candidate SSB occasion belong to different mapping periodicities).

In other words, the L candidate SSB occasions are periodically and sequentially associated with the PRACH time-frequency-code resources in the PRACH time-frequency-code resource set based on the indexes of the candidate SSB occasions and by using first preset duration as the mapping periodicity. A value of the first preset duration may be specified in a protocol or a regulation, or may be notified by the network device by using broadcast information. For example, the first preset duration is X milliseconds, X slots, or X time units, where X is a positive integer.

Further, the M candidate SSB occasions adjacent in the time sequence are M candidate SSB occasions adjacent in the time sequence in the L candidate SSB occasions. A definition of the M candidate SSB occasions adjacent in the time sequence in the L candidate SSB occasions is described above, and details are not described again.

To be specific, a candidate SSB occasion in the SSB time window is mapped to a PRACH time-frequency-code resource in a cyclic shift mapping manner, so that a plurality of candidate SSB occasions in the SSB time window are mapped to a same PRACH time-frequency-code resource. In this way, the network device may select, based on a result of channel sensing, one of the plurality of candidate SSB occasions to send an SSB, so that actually sent SSBs can be mapped to all available PRACH resources without affecting unique associations between the PRACH time-frequency-code resources and the actually sent SSBs, thereby more efficiently using the PRACH resources and avoiding a waste of the PRACH resources.

It should be understood that the index herein may be an index of the candidate SSB occasion, or may be an SSB index of the SSB sent on the candidate SSB occasion. To be specific, an index indicated by the network device by using a DMRS and/or a PBCH is not necessarily bound to a time rank of the SSB, but may be a time position or a time sequence index of the candidate SSB occasion in the candidate SSB occasion set. For example, an SSB #k is a $k^{th}$ or $(k+1)^{th}$ candidate SSB occasion sorted in time order in all the candidate SSB occasions included in the candidate SSB occasion set.

When the L candidate SSB occasions are all candidate SSB occasions included in the SSB time window, M is less than or equal to L. Specific values of L and M are not limited in this embodiment of this application. To increase an SSB sending occasion and make up for a loss caused because that an SSB cannot be sent due to a channel sensing failure, a relatively large quantity (namely, L) of candidate SSB occasions may be defined for the SSB time window.

If the quantity of candidate SSB occasions supported in the SSB time window is 8, and the maximum quantity M of SSBs that can be sent by the network device is 4, the eight candidate SSB occasions in the SSB time window may include two candidate SSB occasion sets, namely, the first candidate SSB occasion set and the second candidate SSB occasion set. The first candidate SSB occasion set and the second candidate SSB occasion set are mapped to a same PRACH time-frequency-code resource set. Four candidate SSB occasions in the first candidate SSB occasion set are sequentially mapped to different PRACH time-frequency-code resources in the PRACH time-frequency-code resource set. Four candidate SSB occasions in the second candidate SSB occasion set are sequentially mapped to different PRACH time-frequency-code resources in the PRACH time-frequency-code resource set. In this scenario, a candidate SSB occasion in the first candidate SSB occasion set and a candidate SSB occasion in the second candidate SSB occasion set (for example, a $k^{th}$ candidate SSB occasion sorted based on the time sequence in the first candidate SSB occasion set and a $k^{th}$ candidate SSB occasion sorted based on the time sequence in the second candidate SSB occasion set, where k is a positive integer less than or equal to M) are mapped to the same first PRACH time-frequency-code resource.

For example, all the candidate SSB occasions included in the first candidate SSB occasion set are adjacent in terms of time, and all the candidate SSB occasions included in the second candidate SSB occasion set are adjacent in terms of time. In other words, all the candidate SSB occasions included in the first candidate SSB occasion set are candidate SSB occasions whose time indexes or candidate SSB occasion indexes are consecutive, and all the candidate SSB occasions included in the second candidate SSB occasion set are candidate SSB occasions whose time indexes or candidate SSB occasion indexes are consecutive. In other words, the first candidate SSB occasion set is {a candidate SSB occasion #1, a candidate SSB occasion #2, a candidate SSB occasion #3, a candidate SSB occasion #4}, and the second candidate SSB occasion set is {a candidate SSB occasion #5, a candidate SSB occasion #6, a candidate SSB occasion #7, a candidate SSB occasion #8}.

It should be understood that, that the candidate SSB occasions in the first candidate SSB occasion set are sequentially mapped to PRACH time-frequency-code resources in the PRACH time-frequency-code resource set may be as follows: The candidate SSB occasions in the first candidate SSB occasion set are sequentially mapped to the PRACH time-frequency-code resources in the PRACH time-frequency-code resource set based on indexes of the candidate SSB occasions or time ranks of the candidate SSB occasions. For example, as in the prior art, the candidate SSB occasions in the first candidate SSB occasion set may be mapped to the PRACH time-frequency-code resources in the PRACH periodicity first in ascending order of indexes of preamble sequences on one RO then in ascending order of frequency domain indexes of ROs in one PRACH slot then in ascending order of time domain indexes of ROs in one PRACH slot and finally in ascending order of PRACH slots.

It is assumed that the PRACH periodicity supports four PRACH slots in time domain, where each PRACH slot supports one PRACH occasion; and the PRACH periodicity supports two PRACH occasions in frequency domain, where the two PRACH occasions are multiplexed in a frequency division multiplexing manner. Each PRACH occasion includes 64 preamble sequences #1 to #64, and each candidate SSB occasion is mapped to 32 preamble sequences on one PRACH occasion. In other words, the PRACH periodicity includes eight PRACH occasions in total, and associated PRACH time-frequency-code resources RACH_t_f are {a RACH_1_1, a RACH_1_2, a RACH_2_1, a RACH_2_2, a RACH_3_1, a RACH_3_2, a RACH_4_1, a RACH_4_2}. t represents a time domain index, and f represents a frequency domain index.

In this case, a mapping result of the candidate SSB occasions in the first candidate SSB occasion set is: the candidate SSB occasion #1 is mapped to {preambles #1 to #32 of the RACH_1_1, preambles #1 to #32 of the RACH_2_1, preambles #1 to #32 of the RACH_3_1, preambles #1 to #32 of the RACH_4_1}, the candidate SSB occasion #2 is mapped to {preambles #33 to #64 of the RACH_1_1, preambles #33 to #64 of the RACH_2_1, preambles #33 to #64 of the RACH_3_1, preambles #33 to #64 of the RACH_4_1}, the candidate SSB occasion #3 is mapped to {preambles #1 to #32 of the RACH_1_2, preambles #1 to #32 of the RACH_2_2, preambles #1 to #32 of the RACH_3_2, preambles #1 to #32 of the RACH_4_2}, and the candidate SSB occasion #4 is mapped to {preambles #33 to #64 of the RACH_1_2, preambles #33 to #64 of the RACH_2_2, preambles #33 to #64 of the RACH_3_2, preambles #33 to #64 of the RACH_4_2}.

An example in which the candidate SSB occasion is the first candidate SSB occasion is used. In this case, the first PRACH time-frequency-code resource associated with the first candidate SSB occasion is the set {the preambles #1 to #32 of the RACH_1_1, the preambles #1 to #32 of the RACH_2_1, the preambles #1 to #32 of the RACH_3_1, the preambles #1 to #32 of the RACH_4_1}, may be a proper subset of the set, or may be an element in the set (namely, a preamble sequence on an RO).

A mapping manner of the candidate SSB occasions in the second candidate SSB occasion set is the same as that of the first candidate SSB occasion set. Details are not described herein again.

In this scenario, the network device may send, based on a result of channel sensing, four SSBs on four of the eight candidate SSB occasions, and the other four candidate SSB occasions are not used to send SSBs due to a channel sensing failure, or no candidate SSB occasion is subsequently required to continue to send an SSB because all the four SSBs have been sent.

All the candidate SSB occasions in the first candidate SSB occasion set and the second candidate SSB occasion set are mapped to all the PRACH time-frequency-code resources in the PRACH time-frequency-code resource set, so that all the candidate SSB occasions in both the first candidate SSB occasion set and the second candidate SSB occasion set can occupy all the available PRACH time-frequency-code resources. In this way, when the network device sends SSBs on all candidate SSB occasions in one candidate SSB occasion set, it can be ensured that PRACH resources are not wasted. If an SSB fails to be sent on a candidate SSB occasion in the first candidate SSB occasion set due to channel sensing, an SSB may be sent on a candidate SSB occasion, in the second candidate SSB occasion set, mapped to a same PRACH time-frequency-code resource to which the candidate SSB occasion is mapped, to ensure that the PRACH resource is not wasted.

Figure 10A:
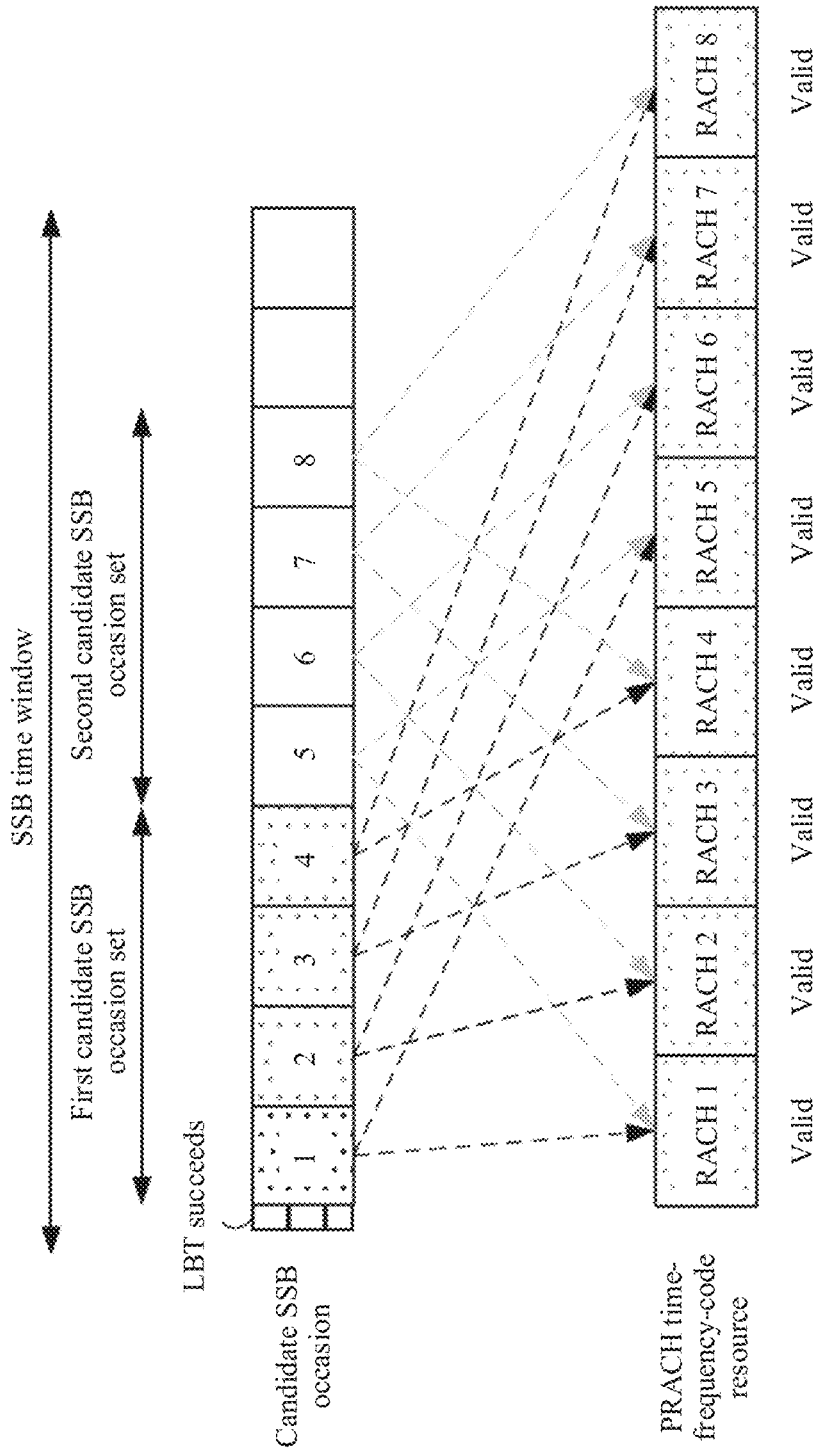
FIG. 10A is a schematic diagram of still another time domain resource according to an embodiment of this application.
Figure 10B:
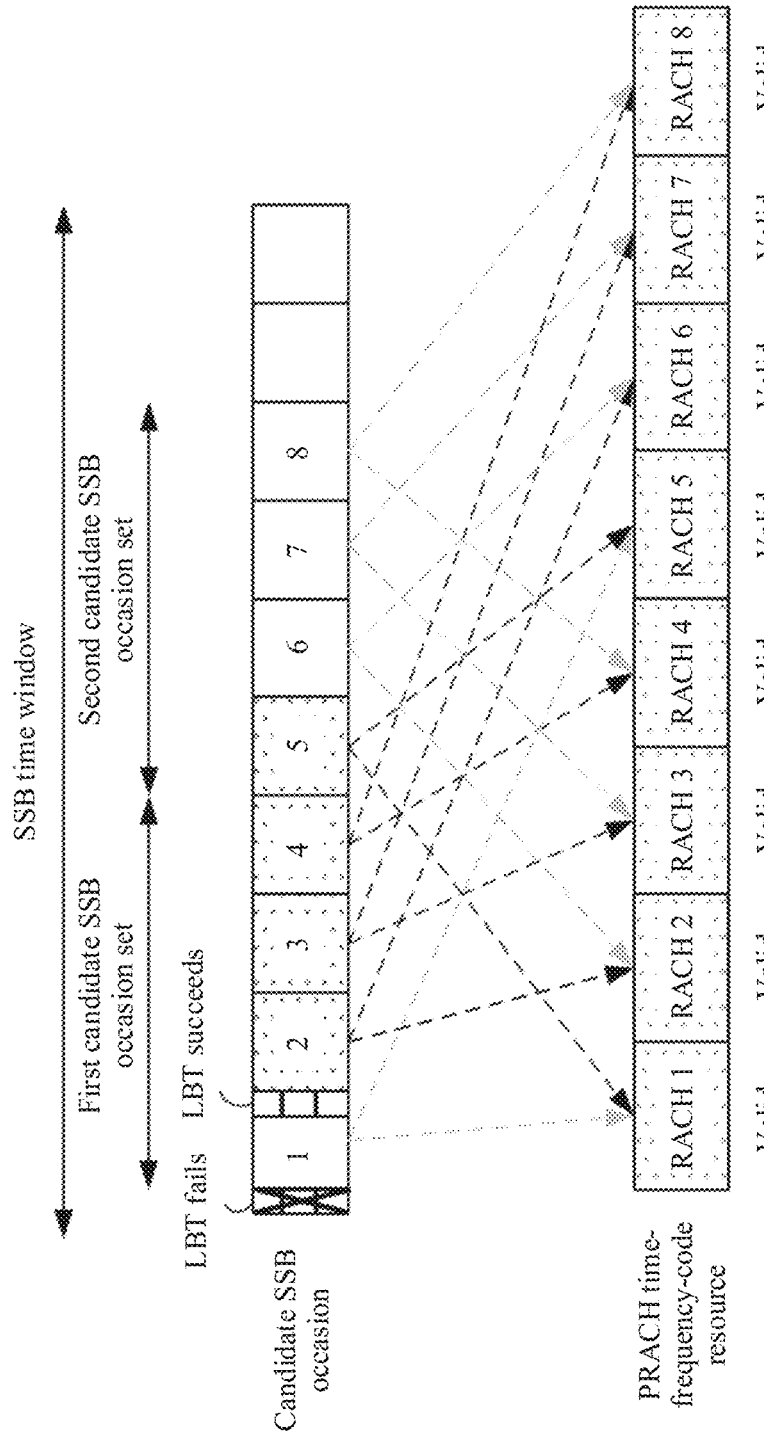
FIG. 10B is a schematic diagram of still another time domain resource according to an embodiment of this application.

The following provides descriptions by using an example. FIG. 10A is a schematic diagram of still another time domain resource according to an embodiment of this application. FIG. 10B is a schematic diagram of still another time domain resource according to an embodiment of this application. For example, an SSB time window includes a maximum of eight candidate SSB occasions. The eight candidate SSB occasions are respectively a candidate SSB occasion #1 to a candidate SSB occasion #8. A maximum quantity of SSBs that need to be actually sent by the network device in the SSB time window is 4. In other words, L is 8, and M is 4. A PRACH time-frequency-code resource set includes a PRACH time-frequency-code resource RACH #1 to a PRACH time-frequency-code resource RACH #8, the first candidate SSB occasion is the candidate SSB occasion #1, and the second candidate SSB occasion is the candidate SSB occasion #5.

A first candidate SSB occasion set is {the candidate SSB occasion #1, the candidate SSB occasion #2, the candidate SSB occasion #3, the candidate SSB occasion #4}, and a second candidate SSB occasion set is {the candidate SSB occasion #5, the candidate SSB occasion #6, the candidate SSB occasion #7, the candidate SSB occasion #8}. PRACH time-frequency-code resources to which the candidate SSB occasion #1 and the candidate SSB occasion #5 are mapped are {the PRACH time-frequency-code resource RACH #1, the PRACH time-frequency-code resource RACH #5}. PRACH time-frequency-code resources to which the candidate SSB occasion #2 and the candidate SSB occasion #6 are mapped are {the PRACH time-frequency-code resource RACH #2, the PRACH time-frequency-code resource RACH #6}. PRACH time-frequency-code resources to which the candidate SSB occasion #3 and the candidate SSB occasion #7 are mapped are {the PRACH time-frequency-code resource RACH #3, the PRACH time-frequency-code resource RACH #7}. PRACH time-frequency-code resources to which the candidate SSB occasion #4 and the candidate SSB occasion #8 are mapped are {the PRACH time-frequency-code resource RACH #4, the PRACH time-frequency-code resource RACH #8}.

As shown in FIG. 10A, if the network device successfully performs channel sensing before the candidate SSB occasion #1, the network device may send four SSBs on the candidate SSB occasion #1 to the candidate SSB occasion #4. In this case, the entire PRACH time-frequency-code resource set can be occupied, to ensure that the PRACH resources are not wasted.

As shown in FIG. 10B, if the network device fails to perform channel sensing before the candidate SSB occasion #1, but successfully performs channel sensing before the candidate SSB occasion #2, the network device may send four SSBs on the candidate SSB occasion #2 to the candidate SSB occasion #5. In this case, the entire PRACH time-frequency-code resource set can still be occupied, to ensure that the PRACH resources are not wasted.

A candidate SSB occasion in the SSB time window is mapped to a PRACH time-frequency-code resource in a cyclic shift mapping manner, so that a plurality of candidate SSB occasions in the SSB time window are mapped to a same PRACH time-frequency-code resource. In this way, the network device may select, based on a result of channel sensing, one of the plurality of candidate SSB occasions to send an SSB, so that actually sent SSBs can be mapped to all available PRACH resources without affecting unique associations between the PRACH time-frequency-code resources and the actually sent SSBs, thereby more efficiently using the PRACH resources and avoiding a waste of the PRACH resources.

In the second case, the first candidate SSB occasion and the second candidate SSB occasion correspond to a same time unit, but correspond to different subbands. To be specific, the first candidate SSB occasion occupies the first time unit in time domain and occupies the first subband in frequency domain. The second candidate SSB occasion occupies the first time unit in time domain and occupies the second subband in frequency domain.

In this embodiment, to improve an SSB sending success probability, the network device may prepare candidate SSB occasions in a plurality of subbands corresponding to a same time unit, to avoid a case in which an SSB in a current time unit cannot be sent because a channel sensing failure occurs in one of the subbands. In this case, the network device may map SSBs in all the subbands corresponding to the same time unit (for example, the first time unit) to a same PRACH time-frequency-code resource. In this way, as long as channel sensing in one subband succeeds, an SSB may be sent in the current time unit, thereby avoiding a waste of PRACH resources.

Figure 11:
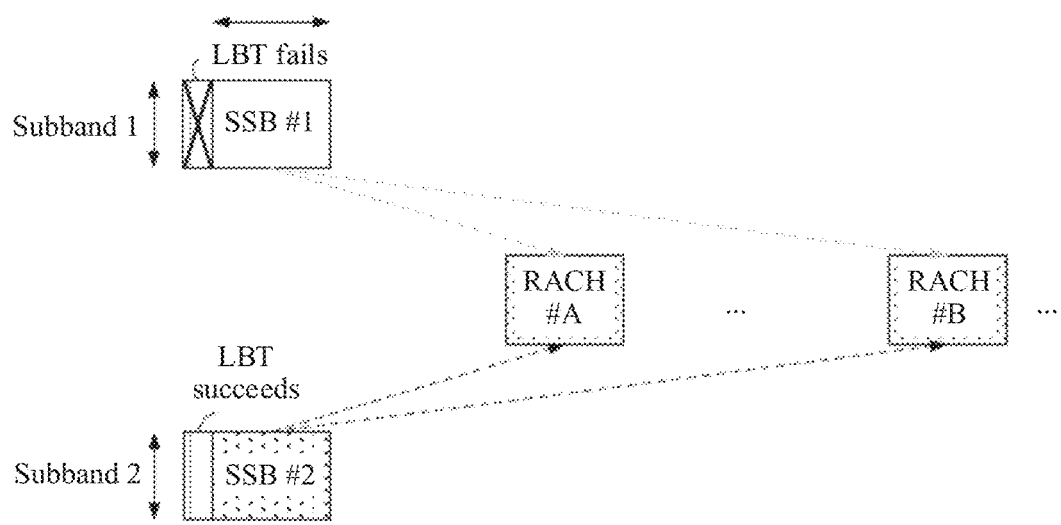
FIG. 11 is a schematic diagram of still another time domain resource according to an embodiment of this application.

FIG. 11 is a schematic diagram of still another time domain resource according to an embodiment of this application. As shown in FIG. 11, for example, both the first candidate SSB occasion (namely, an SSB #1) and the second candidate SSB occasion (namely, an SSB #2) are mapped to the first PRACH time-frequency-code resource (namely, an RACH #A and an RACH #B). In this scenario, that the terminal device sends the SSB based on the LBT result may include the following several cases:

In this scenario, that the terminal device sends the SSB based on the LBT result may include the following several cases:

When the network device successfully performs channel sensing before the first candidate SSB occasion but fails to perform channel sensing before the second candidate SSB occasion, the network device sends the first SSB to the terminal device on the first candidate SSB occasion, and does not send the second SSB to the terminal device on the second candidate SSB occasion. In this way, after detecting the first SSB, the terminal device may occupy the RACH #A and/or the RACH #B to send the random access information. Compared with a manner in which only the second SSB is mapped to the RACH #A and the RACH #B resources, this manner can avoid a waste of PRACH resources.

Alternatively, when the network device fails to perform channel sensing before the first candidate SSB occasion but successfully performs channel sensing before the second candidate SSB occasion, the network device sends the second SSB to the terminal device on the second candidate SSB occasion, and does not send the first SSB to the terminal device on the first candidate SSB occasion. In this way, after detecting the second SSB, the terminal device may occupy the RACH #A and/or the RACH #B to send the random access information. Compared with a manner in which only the first SSB is mapped to the RACH #A and the RACH #B resources, this manner can avoid a waste of PRACH resources.

When the network device successfully performs channel sensing before the first candidate SSB occasion and before the second candidate SSB occasion, the network device sends the first SSB to the terminal device on the first candidate SSB occasion, and does not send the second SSB to the terminal device on the second candidate SSB occasion; or the network device sends the second SSB to the terminal device on the second candidate SSB occasion, and does not send the first SSB to the terminal device on the first candidate SSB occasion.

It should be understood that because channels in different subbands are different, the network device needs to determine, based on the random access information sent by the terminal device, a subband in which a subsequent downlink signal is to be sent in addition to a beam direction in which the subsequent downlink signal is to be sent. Therefore, if the network device sends the first SSB and the second SSB when successfully performing channel sensing for both the first SSB and the second SSB, and the two SSBs are mapped to a same PRACH time-frequency-code resource, even if beam directions in which the two SSBs are sent are the same or approximate, the network device still cannot deduce, after receiving the random access information, a subband in which the terminal device receives the SSB to obtain the random access information through mapping. Consequently, the network device cannot determine the subband used to send the subsequent downlink signal. Therefore, when two candidate SSB occasions mapped to a same PRACH time-frequency-code resource correspond to different subbands, even if the network device successfully performs channel sensing before the two candidate SSB occasions, the network device still selects only one candidate SSB occasion to send an SSB.

Usually, in an existing NR system, a network device sends different SSBs on different candidate SSB occasions and in different beam directions. If a plurality of candidate SSB occasions are mapped to a same PRACH time-frequency-code resource, after receiving random access information sent by a terminal device based on a detected SSB, the network device may fail to identify the SSB that is detected by the terminal device and based on which the random access information is sent, and further fail to determine a beam direction of a subsequent downlink signal.

Correspondingly, in this embodiment, if the network device successfully performs channel sensing before both the first candidate SSB occasion and the second candidate SSB occasion, and as in the prior art, sends the first SSB and the second SSB by using different beams, a problem that a definite beam direction cannot be determined is also caused. To enable the network device to distinguish beam directions, the following constraint may further be imposed in this embodiment of this application that even if the network device successfully performs channel sensing before both the first candidate SSB occasion and the second candidate SSB occasion, the network device occupies only one of the two candidate SSB occasions to send an SSB, and does not occupy the other candidate SSB occasion to send an SSB, to avoid the problem that a definite beam direction cannot be determined.

It should be understood that, in the foregoing embodiment, that the network device performs channel sensing before a candidate SSB occasion (for example, the first candidate SSB occasion or the second candidate SSB occasion) means that the network device performs channel sensing before a downlink burst (burst) including the candidate SSB occasion. The downlink burst refers to at least one time unit that is consecutive in terms of time and that is sent after the network device occupies a channel. Further, the downlink burst including the candidate SSB occasion and another downlink burst are non-consecutive in terms of time. After successfully performing channel sensing, the network device may immediately occupy the channel to start to send the downlink burst. A start moment of the candidate SSB occasion may be equal to a start moment of the downlink burst, or may be later than a start moment of the downlink burst. In other words, when the first candidate SSB occasion and the second candidate SSB occasion are located in a same downlink burst, channel sensing performed by the network device before the first candidate SSB occasion and channel sensing performed by the network device before the second candidate SSB occasion are same channel sensing.

It should further be understood that, that the network device performs channel sensing before the candidate SSB occasion may also be referred to as that the network device performs, before the candidate SSB occasion, channel sensing for a subband in which the candidate SSB occasion is located or a carrier on which the candidate SSB occasion is located, or that the network device performs, before the candidate SSB occasion, channel sensing in a subband in which the candidate SSB occasion is located or on a carrier on which the candidate SSB occasion is located.

It should be understood that, in the foregoing embodiment, that the terminal device may send the random access information on the first PRACH time-frequency-code resource means that when LBT is successfully performed before the first PRACH time-frequency-code resource, the terminal device may send the random access information on the first PRACH time-frequency-code resource.

According to the random access method provided in this embodiment of this application, two candidate SSB occasions are mapped to a same PRACH time-frequency-code resource. In this way, when the network device sends an SSB on a candidate SSB occasion based on a result of channel sensing, even if an SSB cannot be sent on one of the two candidate SSB occasions due to a channel sensing failure, but another SSB can be sent on the other candidate SSB occasion due to a channel sensing success, the PRACH time-frequency-code resource can still be used by a terminal device that detects the another SSB, thereby avoiding a waste of PRACH resources.

Figure 12:
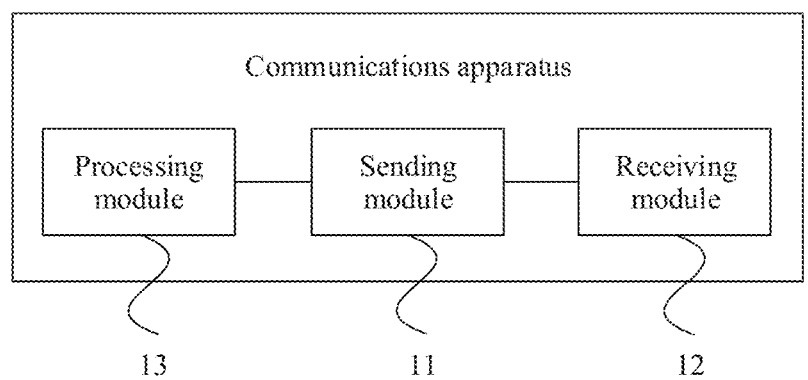
FIG. 12 is a schematic structural diagram of a communications apparatus according to an embodiment of this application.

FIG. 12 is a schematic structural diagram of a communications apparatus according to an embodiment of this application. The communications apparatus implements some or all functions of the network device by using software, hardware, or a combination thereof. The communications apparatus may be a network device, or may be a chip used in a network device. As shown in FIG. 12, the communications apparatus may include a sending module 11 and a receiving module 12.

The sending module 11 is configured to send a first synchronization signal/PBCH block SSB on a first candidate SSB occasion, and/or send a second SSB on a second candidate SSB occasion, where both the first candidate SSB occasion and the second candidate SSB occasion are associated with a first random access channel time-frequency-code resource.

The receiving module 12 is configured to receive random access information sent by a terminal device on the first random access channel time-frequency-code resource.

In a possible implementation, the first candidate SSB occasion occupies a first time unit in time domain and occupies a first subband in frequency domain; and the second candidate SSB occasion occupies a second time unit in time domain and occupies the first subband in frequency domain.

In this implementation, optionally, the first candidate SSB occasion and the second candidate SSB occasion are included in L candidate SSB occasions, and any one of the L candidate SSB occasions is used to send one SSB. When L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer. Any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

For example, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the terminal device to send the random access information.

Optionally, the first candidate SSB occasion and the second candidate SSB occasion are included in L candidate SSB occasions, and any one of the L candidate SSB occasions is used to send one SSB. The L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the terminal device to send the random access information, where M is a positive integer.

M may be, for example, a maximum quantity of SSBs that are allowed to be sent by the communications apparatus in an SSB sending periodicity. M may be configured by the communications apparatus for the terminal device by using broadcast information.

Optionally, when the sending module 11 sends the first synchronization signal/PBCH block SSB on the first candidate SSB occasion, and sends the second SSB on the second candidate SSB occasion, a beam direction in which the sending module 11 sends the first SSB is the same as a beam direction in which the sending module 11 sends the second SSB.

Still referring to FIG. 12, optionally, the apparatus may further include a processing module 13.

The processing module 13 is configured to: when channel sensing is successfully performed before the first candidate SSB occasion and before the second candidate SSB occasion, control the sending module 11 to send the first SSB on the first candidate SSB occasion and to skip sending the second SSB on the second candidate SSB occasion, where the first candidate SSB occasion is located before the second candidate SSB occasion.

In another possible implementation, the first candidate SSB occasion occupies a first time unit in time domain and occupies a first subband in frequency domain; and the second candidate SSB occasion occupies the first time unit in time domain and occupies a second subband in frequency domain.

The communications apparatus provided in this embodiment of this application may perform an action on a network device side in the foregoing method embodiment. An implementation principle and a technical effect of the communications apparatus are similar to those of the method embodiment, and details are not described herein again.

Figure 13:
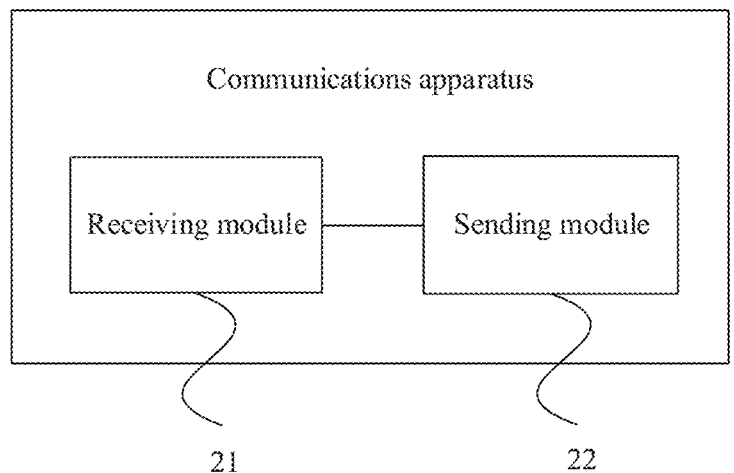
FIG. 13 is a schematic structural diagram of another communications apparatus according to an embodiment of this application.

FIG. 13 is a schematic structural diagram of another communications apparatus according to an embodiment of this application. The communications apparatus implements some or all functions of the terminal device by using software, hardware, or a combination thereof. The communications apparatus may be a terminal device, or may be a chip used in a terminal device. As shown in FIG. 13, the communications apparatus may include a receiving module 21 and a sending module 22.

The receiving module 21 is configured to receive a first synchronization signal/PBCH block SSB sent by a network device on a first candidate SSB occasion, and/or receive a second SSB sent by the network device on a second candidate SSB occasion, where both the first candidate SSB occasion and the second candidate SSB occasion are associated with a first random access channel time-frequency-code resource.

The sending module 22 is configured to send random access information to the network device on the first random access channel time-frequency-code resource.

In a possible implementation, the first candidate SSB occasion occupies a first time unit in time domain and occupies a first subband in frequency domain; and the second candidate SSB occasion occupies a second time unit in time domain and occupies the first subband in frequency domain.

In this implementation, optionally, the first candidate SSB occasion and the second candidate SSB occasion are included in L candidate SSB occasions, and any one of the L candidate SSB occasions is used to send one SSB. When L is greater than or equal to a first threshold, the L candidate SSB occasions include at least two disjoint candidate SSB occasion sets, and any one of the at least two disjoint candidate SSB occasion sets includes at least one candidate SSB occasion adjacent in a time sequence, where L is a positive integer. Any two different candidate SSB occasions in any one of the at least two disjoint candidate SSB occasion sets are associated with different random access channel time-frequency-code resources, and the first candidate SSB occasion and the second candidate SSB occasion are included in different candidate SSB occasion sets in the at least two disjoint candidate SSB occasion sets.

For example, each of the at least two disjoint candidate SSB occasion sets includes M candidate SSB occasions adjacent in the time sequence, the candidate SSB occasions in any one of the at least two disjoint candidate SSB occasion sets are sequentially associated with random access channel time-frequency-code resources in a random access time-frequency-code resource set based on indexes of the candidate SSB occasions, candidate SSB occasions having a same time sequence index that are in different candidate SSB occasion sets in the at least two disjoint candidate SSB occasion sets are associated with a same random access channel time-frequency-code resource, a time sequence index of the first candidate SSB occasion is the same as a time sequence index of the second candidate SSB occasion, and the random access time-frequency-code resource set includes at least one time-frequency-code resource used by the terminal device to send the random access information.

Optionally, the first candidate SSB occasion and the second candidate SSB occasion are included in L candidate SSB occasions, and any one of the L candidate SSB occasions is used to send one SSB. The L candidate SSB occasions are periodically and sequentially associated with random access channel time-frequency-code resources in a random access time-frequency-code resource set based on indexes of the candidate SSB occasions and by using M candidate SSB occasions adjacent in a time sequence as a mapping periodicity, any two candidate SSB occasions belonging to a same mapping periodicity that are in the L candidate SSB occasions are associated with different random access channel time-frequency-code resources in the random access time-frequency-code resource set, the first SSB and the second SSB are sent on candidate SSB occasions in different mapping periodicities, and the random access time-frequency-code resource set includes at least one time-frequency-code resource used by the terminal device to send the random access information, where M is a positive integer.

M may be, for example, a maximum quantity of SSBs that are allowed to be sent by the network device in an SSB sending periodicity. M may be configured by the network device for the communications apparatus by using broadcast information.

Optionally, when the network device sends the first synchronization signal/PBCH block SSB on the first candidate SSB occasion, and sends the second SSB on the second candidate SSB occasion, a beam direction in which the network device sends the first SSB is the same as a beam direction in which the network device sends the second SSB.

In another possible implementation, the first candidate SSB occasion occupies a first time unit in time domain and occupies a first subband in frequency domain; and the second candidate SSB occasion occupies the first time unit in time domain and occupies a second subband in frequency domain.

The communications apparatus provided in this embodiment of this application may perform an action on a terminal device side in the foregoing method embodiment. An implementation principle and a technical effect of the communications apparatus are similar to those of the method embodiment, and details are not described herein again.

It should be noted that, it should be understood that the sending module may be a transmitter in an actual implementation, and the receiving module may be a receiver in an actual implementation. The processing module may be implemented in a form of software invoked by a processing element, or may be implemented in a form of hardware. For example, the processing module may be a separately disposed processing element, or may be integrated into a chip of the foregoing apparatus for implementation. In addition, the processing module may alternatively be stored in a memory of the foregoing apparatus in a form of program code, and is invoked by a processing element of the foregoing apparatus to perform a function of the processing module. In addition, all or some of the modules may be integrated together, or may be implemented independently. The processing element described herein may be an integrated circuit with a signal processing capability. In an implementation process, the steps in the method or the modules can be implemented by using a hardware integrated logic circuit in the processing element, or by using instructions in a form of software.

For example, the foregoing modules may be configured as one or more integrated circuits for implementing the method, such as one or more application-specific integrated circuits (application specific integrated circuit, ASIC), one or more microprocessors (digital signal processor, DSP), or one or more field programmable gate arrays (field programmable gate array, FPGA). For another example, when one of the foregoing modules is implemented in a form of scheduling program code by a processing element, the processing element may be a general-purpose processor, for example, a central processing unit (central processing unit, CPU) or another processor that can invoke the program code. For another example, the modules may be integrated together, and implemented in a form of a system-on-a-chip (system-on-a-chip, SOC).

Figure 14:
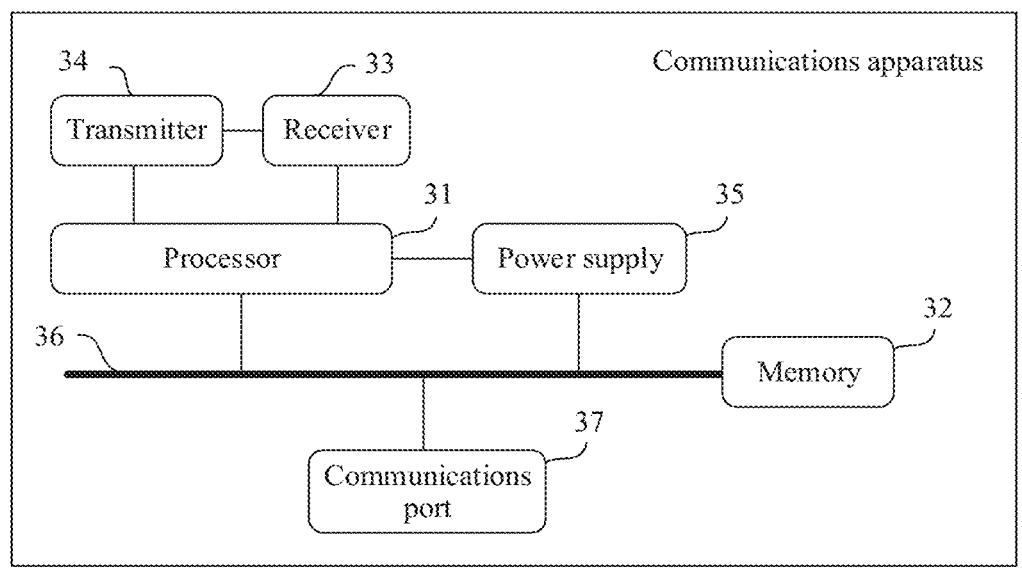
FIG. 14 is a schematic structural diagram of still another communications apparatus according to an embodiment of this application.

FIG. 14 is a schematic structural diagram of still another communications apparatus according to an embodiment of this application. As shown in FIG. 14, the communications apparatus may include a processor 31 (for example, a CPU), a memory 32, a receiver 33, and a transmitter 34. Both the receiver 33 and the transmitter 34 are coupled to the processor 31, and the processor 31 controls a receiving action of the receiver 33 and a sending action of the transmitter 34. The memory 32 may include a high-speed random access memory (random-access memory, RAM), and may further include a non-volatile memory (non-volatile memory, NVM), for example, at least one magnetic disk storage. The memory 32 may store various instructions, to complete various processing functions and implement method steps in this application. Optionally, the communications apparatus in this application may further include a power supply 35, a communications bus 36, and a communications port 37. The receiver 33 and the transmitter 34 may be integrated into a transceiver of the communications apparatus, or may be independent transceiver antennas on the communications apparatus. The communications bus 36 is configured to implement communication connection between components. The communications port 37 is configured to implement connection and communication between the communications apparatus and another peripheral.

In this embodiment of this application, the memory 32 is configured to store computer-executable program code, and the program code includes an instruction. When the processor 31 executes the instruction, the instruction enables the processor 31 of the communications apparatus to perform a processing action of the network device in the foregoing method embodiment, enables the receiver 33 to perform a receiving action of the network device in the foregoing method embodiment, and enables the transmitter 34 to perform a sending action of the network device in the foregoing method embodiment. An implementation principle and a technical effect of the communications apparatus are similar to those of the method embodiment, and details are not described herein again.

Figure 15:
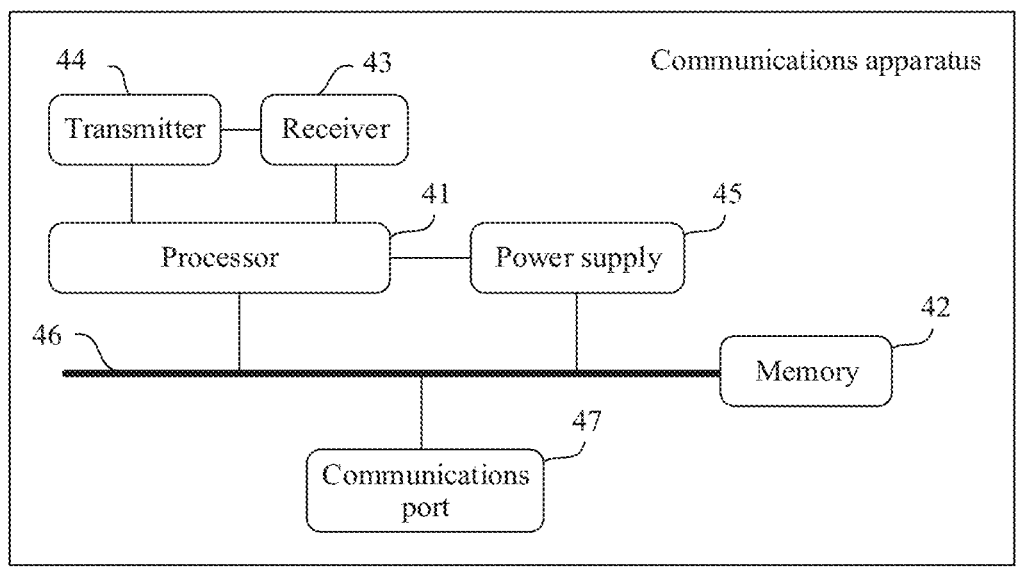
FIG. 15 is a schematic structural diagram of still another communications apparatus according to an embodiment of this application.

FIG. 15 is a schematic structural diagram of still another communications apparatus according to an embodiment of this application. As shown in FIG. 15, the communications apparatus may include a processor 41 (for example, a CPU), a memory 42, a receiver 43, and a transmitter 44. Both the receiver 43 and the transmitter 44 are coupled to the processor 41, and the processor 41 controls a receiving action of the receiver 43 and a sending action of the transmitter 44. The memory 42 may include a high-speed RAM, and may further include a non-volatile memory NVM, for example, at least one magnetic disk storage. The memory 42 may store various instructions, to complete various processing functions and implement method steps in this application. Optionally, the communications apparatus in this application may further include a power supply 45, a communications bus 46, and a communications port 47. The receiver 43 and the transmitter 44 may be integrated into a transceiver of the communications apparatus, or may be independent transceiver antennas on the communications apparatus. The communications bus 46 is configured to implement communication connection between components. The communications port 47 is configured to implement connection and communication between the communications apparatus and another peripheral.

In this application, the memory 42 is configured to store computer-executable program code, and the program code includes an instruction. When the processor 41 executes the instruction, the instruction enables the processor 41 of the communications apparatus to perform a processing action of the terminal device in the foregoing method embodiment, enables the receiver 43 to perform a receiving action of the terminal device in the foregoing method embodiment, and enables the transmitter 44 to perform a sending action of the terminal device in the foregoing method embodiment. An implementation principle and a technical effect of the communications apparatus are similar to those of the method embodiment, and details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When a computer program instruction is loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In a formula, the character "/" indicates a "division" relationship between associated objects.

It may be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A random access method, comprising:
   sending, by a network device, at least one of a first synchronization signal/PBCH block (SSB) on a first candidate SSB occasion or a second SSB on a second candidate SSB occasion, wherein both the first candidate SSB occasion and the second candidate SSB occasion are associated with a first random access channel time-frequency-code resource; and
   receiving, by the network device, random access information sent by a terminal device on the first random access channel time-frequency-code resource,
   wherein the first candidate SSB occasion and the second candidate SSB occasion are comprised in L candidate SSB occasions,
   wherein the L candidate SSB occasions include a first set and a second set of candidate SSB occasions,
   wherein each of the first set and the second set of candidate SSB occasions includes M candidate SSB occasions adjacent in time sequence,
   wherein the first set and the second set of candidate SSB occasions do not include candidate SSB occasions from each other,
   wherein the M candidate SSB occasions in the first set of candidate SSB occasions include the first candidate SSB occasion,
   wherein the M candidate SSB occasions in the second set of SSB include the second candidate SSB occasion, and
   wherein a time sequence index of the first candidate SSB occasion in the M candidate SSB occasions and a time sequence index of the second candidate SSB occasion in the M candidate SSB occasions are same.

2. The method according to claim 1, wherein the M candidate SSB occasions in the first set are sequentially mapped to a random access channel time-frequency-code resource set, the M candidate SSB occasions in the second set are sequentially mapped to the random access channel time-frequency-code resource set, the random access channel time-frequency-code resource set includes the first random access channel time-frequency-code resource.

3. The method according to claim 1, wherein the L candidate SSB occasion are comprised in a SSB time window, the length of the SSB time window is half frame.

4. The method according to claim 1, wherein the value of M is configured by using broadcast information.

5. The method according to claim 1, wherein L is less than or equal to 8, SSB index of the first candidate SSB occasion is indicated by using a DMRS sequence carried in a first SSB, SSB index of the second candidate SSB occasion is indicated by using a DMRS sequence carried in a second SSB, wherein the SSB index is an index that is of a candidate SSB occasion in the L candidate SSB occasions included in the SSB time window and that is sorted in time order.

6. The method according to claim 1, wherein L is greater than 8, SSB index of the first candidate SSB occasion is indicated by using a DMRS sequence and bit information on a physical broadcast channel (PBCH) carried in a first SSB, SSB index of the second candidate SSB occasion is indicated by using a DMRS sequence and bit information on a PBCH carried in a second SSB, wherein the SSB index is an index that is of a candidate SSB occasion in the L candidate SSB occasions included in the SSB time window and that is sorted in time order.

7. A random access method, comprising:
   receiving, by a terminal device, at least one of a first synchronization signal/PBCH block SSB sent by a network device on a first candidate SSB occasion or a second SSB sent by the network device on a second candidate SSB occasion, wherein both the first candidate SSB occasion and the second candidate SSB occasion are associated with a first random access channel time-frequency-code resource; and
   sending, by the terminal device, random access information to the network device on the first random access channel time-frequency-code resource,
   wherein the first candidate SSB occasion and the second candidate SSB occasion are comprised in L candidate SSB occasions,
   wherein the L candidate SSB occasions include a first set and a second set of candidate SSB occasions,
   wherein each of the first set and the second set of candidate SSB occasions includes M candidate SSB occasions adjacent in time sequence,
   wherein the first set and the second set of candidate SSB occasions do not include candidate SSB occasions from each other,
   wherein the M candidate SSB occasions in the first set of candidate SSB occasions include the first candidate SSB occasion,
   wherein the M candidate SSB occasions in the second set of SSB include the second candidate SSB occasion, and
   wherein a time sequence index of the first candidate SSB occasion in the M candidate SSB occasions and a time sequence index of the second candidate SSB occasion in the M candidate SSB occasions are same.

8. The method according to claim 7, wherein the M candidate SSB occasions in the first set are sequentially mapped to a random access channel time-frequency-code resource set, the M candidate SSB occasions in the second set are sequentially mapped to the random access channel time-frequency-code resource set, the random access channel time-frequency-code resource set includes the first random access channel time-frequency-code resource.

9. The method according to claim 7, wherein the L candidate SSB occasion are comprised in a SSB time window, the length of the SSB time window is half frame.

10. The method according to claim 7, wherein the value of M is configured by using broadcast information.

11. The method according to claim 7, wherein L is less than or equal to 8, SSB index of the first candidate SSB occasion is indicated by using a DMRS sequence carried in a first SSB, SSB index of the second candidate SSB occasion is indicated by using a DMRS sequence carried in a second SSB, wherein the SSB index is an index that is of a candidate SSB occasion in the L candidate SSB occasions included in the SSB time window and that is sorted in time order.

12. The method according to claim 7, wherein L is greater than 8, SSB index of the first candidate SSB occasion is indicated by using a DMRS sequence and bit information on a physical broadcast channel (PBCH) carried in a first SSB, SSB index of the second candidate SSB occasion is indicated by using a DMRS sequence and bit information on a PBCH carried in a second SSB, wherein the SSB index is an index that is of a candidate SSB occasion in the L candidate SSB occasions included in the SSB time window and that is sorted in time order.

13. A communications apparatus, comprising a processor and a memory, wherein
the memory is configured to store a computer-executable instruction; and
the processor is configured to execute the computer-executable instruction stored in the memory, so that the communications apparatus performs a method comprising:
sending at least one of a first synchronization signal/PBCH block (SSB) on a first candidate SSB occasion or a second SSB on a second candidate SSB occasion, wherein both the first candidate SSB occasion and the second candidate SSB occasion are associated with a first random access channel time-frequency-code resource; and
receiving random access information sent by a terminal device on the first random access channel time-frequency-code resource,
wherein the first candidate SSB occasion and the second candidate SSB occasion are comprised in L candidate SSB occasions,
wherein the L candidate SSB occasions include a first set and a second set of candidate SSB occasions,
wherein each of the first set and the second set of candidate SSB occasions includes M candidate SSB occasions adjacent in time sequence,
wherein the first set and the second set of candidate SSB occasions do not include candidate SSB occasions from each other,
wherein the M candidate SSB occasions in the first set of candidate SSB occasions include the first candidate SSB occasion,
wherein the M candidate SSB occasions in the second set of SSB include the second candidate SSB occasion, and
wherein a time sequence index of the first candidate SSB occasion in the M candidate SSB occasions and a time sequence index of the second candidate SSB occasion in the M candidate SSB occasions are same.

14. The apparatus according to claim 13, wherein the M candidate SSB occasions in the first set are sequentially mapped to a random access channel time-frequency-code resource set, the M candidate SSB occasions in the second set are sequentially mapped to the random access channel time-frequency-code resource set, the random access channel time-frequency-code resource set includes the first random access channel time-frequency-code resource.

15. The apparatus according to claim 13, wherein the L candidate SSB occasion are comprised in a SSB time window, the length of the SSB time window is half frame.

16. The apparatus according to claim 13, wherein the value of M is configured by using broadcast information.

17. The apparatus according to claim 13, wherein L is less than or equal to 8, SSB index of the first candidate SSB occasion is indicated by using a DMRS sequence carried in a first SSB, SSB index of the second candidate SSB occasion is indicated by using a DMRS sequence carried in a second SSB, wherein the SSB index is an index that is of a candidate SSB occasion in the L candidate SSB occasions included in the SSB time window and that is sorted in time order.

18. The apparatus according to claim 13, wherein L is greater than 8, SSB index of the first candidate SSB occasion is indicated by using a DMRS sequence and bit information on a physical broadcast channel (PBCH) carried in a first SSB, SSB index of the second candidate SSB occasion is indicated by using a DMRS sequence and bit information on a PBCH carried in a second SSB, wherein the SSB index is an index that is of a candidate SSB occasion in the L candidate SSB occasions included in the SSB time window and that is sorted in time order.

19. A communications apparatus, comprising a processor and a memory, wherein
the memory is configured to store a computer-executable instruction; and
the processor is configured to execute the computer-executable instruction stored in the memory, so that the communications apparatus performs a method comprising:
receiving at least one of a first synchronization signal/PBCH block SSB sent by a network device on a first candidate SSB occasion or a second SSB sent by the network device on a second candidate SSB occasion, wherein both the first candidate SSB occasion and the second candidate SSB occasion are associated with a first random access channel time-frequency-code resource; and
sending random access information to the network device on the first random access channel time-frequency-code resource,
wherein the first candidate SSB occasion and the second candidate SSB occasion are comprised in L candidate SSB occasions,
wherein the L candidate SSB occasions include a first set and a second set of candidate SSB occasions,
wherein each of the first set and the second set of candidate SSB occasions includes M candidate SSB occasions adjacent in time sequence,
wherein the first set and the second set of candidate SSB occasions do not include candidate SSB occasions from each other,
wherein the M candidate SSB occasions in the first set of candidate SSB occasions include the first candidate SSB occasion,
wherein the M candidate SSB occasions in the second set of SSB include the second candidate SSB occasion, and
wherein a time sequence index of the first candidate SSB occasion in the M candidate SSB occasions and a time sequence index of the second candidate SSB occasion in the M candidate SSB occasions are same.

20. The apparatus according to claim 19, wherein the M candidate SSB occasions in the first set are sequentially mapped to a random access channel time-frequency-code resource set, the M candidate SSB occasions in the second set are sequentially mapped to the random access channel time-frequency-code resource set, the random access channel time-frequency-code resource set includes the first random access channel time-frequency-code resource.

21. The apparatus according to claim 19, wherein the L candidate SSB occasion are comprised in a SSB time window, the length of the SSB time window is half frame.

22. The apparatus according to claim 19, wherein the value of M is configured by using broadcast information.

23. The apparatus according to claim 19, wherein L is less than or equal to 8, SSB index of the first candidate SSB occasion is indicated by using a DMRS sequence carried in a first SSB, SSB index of the second candidate SSB occasion is indicated by using a DMRS sequence carried in a second SSB, wherein the SSB index is an index that is of a candidate SSB occasion in the L candidate SSB occasions included in the SSB time window and that is sorted in time order.

24. The apparatus according to claim 19, wherein L is greater than 8, SSB index of the first candidate SSB occasion is indicated by using a DMRS sequence and bit information on a physical broadcast channel (PBCH) carried in a first SSB, SSB index of the second candidate SSB occasion is indicated by using a DMRS sequence and bit information on a PBCH carried in a second SSB, wherein the SSB index is an index that is of a candidate SSB occasion in the L candidate SSB occasions included in the SSB time window and that is sorted in time order.

* * * * *